(12) United States Patent
Tsukuda et al.

(10) Patent No.: US 7,054,235 B2
(45) Date of Patent: May 30, 2006

(54) TILT CORRECTION METHOD OF MOVABLE PORTION, TILT CORRECTION METHOD OF OBJECTIVE LENS FOR OPTICAL DISK, AND OBJECTIVE LENS DRIVING DEVICE FOR OPTICAL DISK

(75) Inventors: Satsuki Tsukuda, Fujiidera (JP); Yoshihiro Sekimoto, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 690 days.

(21) Appl. No.: 09/880,385

(22) Filed: Jun. 13, 2001

(65) Prior Publication Data

US 2002/0009032 A1    Jan. 24, 2002

(30) Foreign Application Priority Data

Jun. 14, 2000  (JP)  ............................. 2000-178428
Jun. 4, 2001   (JP)  ............................. 2001-168148

(51) Int. Cl.
    *G11B 7/08*    (2006.01)
(52) U.S. Cl. ..................................... 369/44.15; 720/682
(58) Field of Classification Search ............. 369/44.32, 369/53.19, 44.16
    See application file for complete search history.

(56) References Cited

U.S. PATENT DOCUMENTS 4,948,230 A * 8/1990 Kasahara et al. ........... 359/823
5,768,034 A * 6/1998 Marino ........................ 359/814
6,134,058 A * 10/2000 Mohri et al. ................. 359/824
6,163,416 A * 12/2000 Uekusa et al. .............. 359/813
6,362,927 B1 * 3/2002 Hori ............................ 359/813
6,480,460 B1 * 11/2002 Ohkuma et al. ............ 369/246
6,665,238 B1 * 12/2003 Ijima et al. .............. 369/44.15
6,747,921 B1 * 6/2004 Wakabayashi et al. ... 369/44.16

FOREIGN PATENT DOCUMENTS

| JP | 06-139599 | 5/1994 |
| JP | 09-016996 | 1/1997 |
| JP | 10-040560 | 2/1998 |
| JP | 10-124896 | 5/1998 |
| JP | 10-198992 | 7/1998 |
| JP | 11-086308 | 3/1999 |

* cited by examiner

*Primary Examiner*—Brian E. Miller
*Assistant Examiner*—Michael V. Battaglia
(74) *Attorney, Agent, or Firm*—David G. Conlin; Steven M. Jensen; Edwards Angell Palmer & Dodge, LLP

(57) ABSTRACT

In an objective lens driving device for an optical disk, a plurality of elastic supporting members supporting an objective lens have bent portions bent approximately in the focus direction and are arranged in parallel approximately in the focus direction to cause expansion/contraction of the elastic supporting members in the direction offsetting a moment M. With this structure, a tilt correction method of the movable portion, a tilt correction method of an objective lens for an optical disk, and an objective lens driving device for an optical disk can be provided capable of reducing the size of the movable portion, minimizing tilt of the objective lens in the focus direction to provide enhanced optical performance, and restraining a resonance peak by the elastic supporting members.

15 Claims, 19 Drawing Sheets

FIG.33A PRIOR ART    FIG.33B PRIOR ART
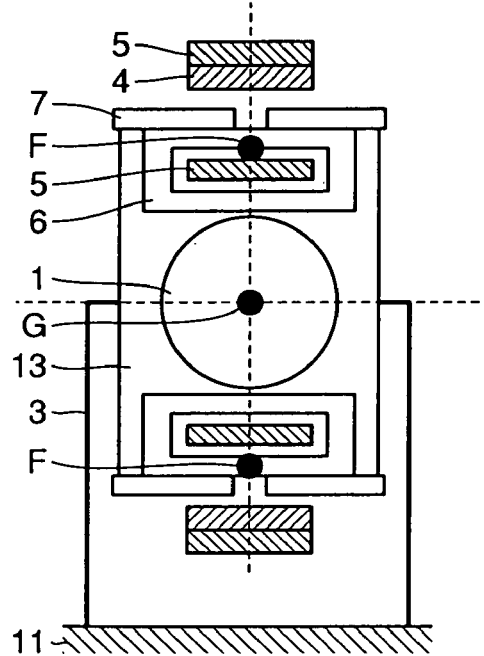
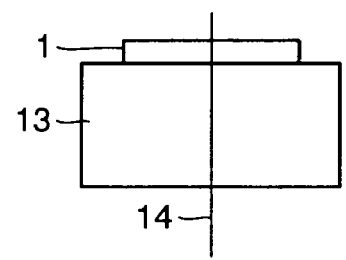
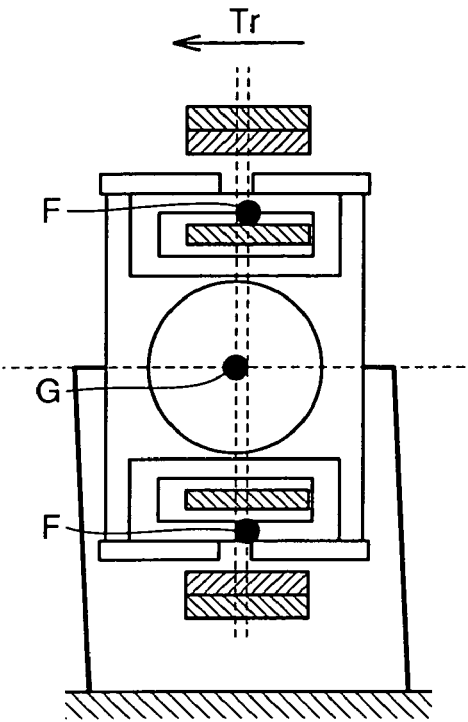
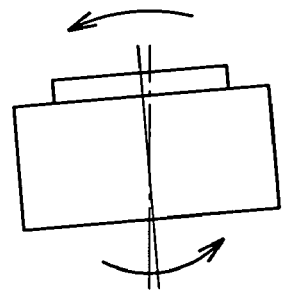
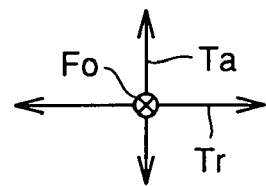

TILT CORRECTION METHOD OF MOVABLE PORTION, TILT CORRECTION METHOD OF OBJECTIVE LENS FOR OPTICAL DISK, AND OBJECTIVE LENS DRIVING DEVICE FOR OPTICAL DISK

BACKGROUND OF THE INVENTION

1. Field of the Invention

The present invention relates to tilt correction methods of a movable portion, tilt correction methods of an objective lens for an optical disk, and objective lens driving devices for an optical disk. More specifically, the present invention relates to a tilt correction method of a movable portion, tilt correction method of an objective lens for an optical disk, and an objective lens driving device for an optical disk for recording/reproducing information with respect to an optical disk of an optical information recording medium such as an MD, CD-ROM, and DVD.

2. Description of the Background Art

An optical recording/reproducing apparatus collects/scans as small spots of light beams over an information recording track of an optical disk for recording and erasing information. The optical recording/reproducing apparatus reads reflection of the light beam directed to an information recording surface for reproducing information.

When such an optical recording/reproducing apparatus records information, for example, the optical disk which is rotating at high speed may be subjected to surface vibration, decentering, and rotation oscillation. Accordingly, to reliably record, erase and reproduce information with respect to the optical disk, spots of light beams have to precisely follow the track even in the event of surface vibration or the like.

To meet this need, an objective lens for an optical disk used in an optical recording/reproducing apparatus is conventionally provided with a drive control mechanism which includes a focus servo mechanism adapted to slightly move in the perpendicular direction (optical axis direction) with respect to a disk surface, and a tracking servo mechanism adapted to slightly move in the radial direction with respect to the disk surface (orthogonal direction with respect to a recording track). The drive control mechanism has constantly provided positional control of an objective lens for an optical disk.

Now, a brief description of an objective lens driving device for an optical disk provided with a conventional drive control mechanism will be given with reference to the drawings. FIG. 42 is a side view of an objective lens driving device for an optical disk 101 used for explaining a positional relationship between objective lens driving device for optical disk 101 and an optical disk 10 in the conventional art. FIG. 43 shows an objective lens driving device for optical disk 101 when viewed from above.

As shown in FIGS. 42 and 43, objective lens driving device for optical disk 101 is positioned below optical disk 10. The direction perpendicular to the surface of optical disk 10 (optical axis direction) is hereinafter defined as the focus direction Fo (the direction indicated by an arrow Fo in the drawing), the direction parallel to the surface of optical disk 10 and perpendicular to the track direction (radial direction of optical disk 10) as the tracking direction Tr (the direction indicated by an arrow Tr in the drawing), and the tangential direction of the disk as the tangential direction Ta (the direction indicated by an arrow Ta in the drawing).

A reflection mirror 9 is provided on a base for guiding a laser beam to objective lens 1. A movable portion includes: an objective lens 1 of a pickup optical system for an optical disk; an objective lens holder 2 for holding objective lens 1 approximately at the center; a pair of hollow focus coils 6 provided on the side walls of objective lens holder 2; and a tracking coil 7 fixed at each focus coil 6. The movable portion is supported by an elastic supporting member 3 of, for example, four parallel metal wires. Elastic supporting member 3 supports the movable portion in such a way to allow its slight movement in focus direction Fo and tracking direction Tr that are orthogonal to the longitudinal direction of elastic supporting member 3.

Elastic supporting member 3 has one end mounted to a mounting member 8 fixed to the side surface of objective lens holder 2 that is orthogonal to tracking direction Tr, and the other end mounted to a fixed portion 11 (an optical base). Elastic supporting member 3 has, on its one or both surfaces (on both surfaces in FIG. 43), a damper material 12. Note that mounting member 8 is used for mounting elastic supporting member 3 and serves to provide electrical communication among focus coil 6, tracking coil 7 (these coils may be hereinafter collectively referred to as "a driving coil"), and metal elastic supporting member 3.

Objective lens driving device for optical disk 101 is further provided with a magnetic circuit which includes a magnet 4 and a yoke 5 for driving objective lens holder 2 in focus direction Fo and tracking direction Tr. Yoke 5 consists of two inner yokes 5(a) and two outer yokes 5(b) which are orthogonal to the optical axis direction. Two magnets 4 are respectively mounted on the surfaces of two outer yokes 5(b) that face inner yokes 5(a).

Since inner yokes 5(a) are inserted in focus coils 6, objective lens holder 2 fixed to the driving coil can be driven by controlling a current flowing through the driving coil.

Namely, the magnetic circuit formed of magnet 4 and yoke 5 as well as focus coils 6 in the magnetic circuit comprise a dynamoelectric converter which causes movement in focus direction Fo. Thus, by controlling the current in focus coil 6, the driving force in focus direction Fo can be varied. As a result, lens holder 2 mounted with objective lens 1 can be translated in focus direction Fo against the elastic force of elastic supporting member 3.

Further, the magnetic circuit formed of magnet 4 and yoke 5 as well as tracking coil 7 positioned in the magnetic circuit comprise a dynamoelectric converter which causes movement in tracking direction Tr. Thus, by controlling the current in tracking coil 7, the driving force in tracking direction Tr can be varied. As a result, lens holder 2 mounted with objective lens 1 can be translated in tracking direction Tr against the elastic force of elastic supporting member 3.

Here, as a prior art elastic supporting member, an objective lens driving device disclosed in Japanese Patent Laying-Open No. 6-139599 (Japanese Patent No. 2981351) is illustrated. FIG. 44 is a diagram an elastic supporting member (elastic material) of the objective lens driving device when viewed from above. Linear portions 3a and 3b, respectively extending from the movable and fixed portion sides of elastic supporting member 3, are not collinear. Elastic supporting member 3 has a bent portion 3c between linear portions 3a and 3b (elastic supporting member 3 is bent in tracking direction Tr).

A damper material 12 is fixed to connect an arm portion 3d branching from linear portion 3a extending from the movable portion side and a protruding portion 3e. Elastic supporting member 3 is in the form of a leaf spring with a damper material that has a damping effect applied on one or both surfaces.

The bent portion and damper material of the elastic supporting member serve to suppress vibration of the movable portion in focusing direction Fo and tracking direction Tr and suppress expansion/contraction or torsional oscillation in the longitudinal direction. Thus, a resonance peak is restrained to provide stable driving control.

However, the above described prior art objective lens driving device for the optical disk suffers from the following problems.

The above described prior art objective lens driving device for optical disk tends to deform (expand/contract) in the longitudinal direction because of the bent portion of elastic supporting member 3. For example, as shown in schematic side views of FIGS. 45A, 45B, and 45C, when objective lens 1 is vertically moved in focus direction Fo, it tilts in a specific direction. Namely, the optical axis (solid lines in the drawings) of objective lens 1 are inclined.

FIG. 45B shows that the movable portion is in a neutral position and the optical axis is not inclined. FIG. 45A shows that objective lens 1 is moved upwardly in focus direction Fo. FIG. 45C shows that objective lens is moved downwardly in focus direction Fo. As shown in FIG. 45A, when objective lens 1 is moved upwardly in focus direction Fo, the optical axis is inclined toward fixed portion 11 (+side) in the Ta direction (tangential direction) in the drawing. As shown in FIG. 45C, when objective lens 1 is moved downwardly in focus direction Fo, the optical axis is inclined toward the side opposite fixed portion 11 (−side) in the Ta direction (tangential direction) in the drawing.

If objective lens 1 is inclined as described above, deflection of elastic supporting member 3 produces a moment on the movable portion. For example, if the supporting interval of four parallel elastic supporting members 3 (having a length of 11.45 mm) is 8.26 mm in width and 2.91 mm in height and objective lens 1 is vertically moved by 0.4 mm in focus direction Fo, when elastic supporting member 3 has a bent portion, a tilt amount would be about ±7.6' in the Ta direction. On the other hand, if the elastic supporting member has an linear shape without any bent portion (in this case deformation is unlikely to occur in the longitudinal direction), the tilt is caused by deformation of elastic supporting member 3, and hence the tilt would be no more than about ±0.4' in the Ta direction.

Further, the tilt is affected by the supporting interval of elastic supporting member 3. FIG. 46 is a graph showing a relationship between the interval of the elastic supporting members in the height direction and a tilt amount of the optical axis of the objective lens when only the interval in the height direction is varied in the case of the above described elastic supporting member 3. It also represents the tilt amount of the optical axis when objective lens 1 is moved upwardly in focus direction Fo by 0.4 mm. As can be seen from FIG. 46, the smaller the interval between the elastic supporting members in the height direction is, the greater the tilt amount of the objective lens optical axis is. As the movable portion is reduced in size and thickness, the interval of the elastic supporting members in the height direction decreases and the tilt amount of the objective lens optical axis increases, whereby the problem becomes more serious.

In recent years, the amount of information that an optical recording/reproducing apparatus is required to process is rapidly increased. It is desired that a recording surface density for optical recording is considerably increased accordingly. The recording surface density can be increased for example by reducing the wavelength of a light source or by providing an objective lens with greater numerical aperture. As to the former method of reducing the wavelength of the light source in the optical recording/reproducing apparatus, although light sources having a wavelength of about 780 nm or 650 nm are primarily used, the usage of light sources is gradually shifting to those of violet or blue having a wavelength of about 400 nm.

To mention the effect of coma aberration, since coma aberration is in inverse proportion to the wavelength of a light source, it increases with reduction in the wavelength of the light source. Accordingly, to reduce coma aberration, a tilt amount on the side of the optical recording/reproducing apparatus must be reduced to about 50–60% of the current amount. With the increasing need for reducing the tilt amount in the optical recording/reproducing apparatus, the tilt amount allowed to an actuator is desirably 50% or lower of the current amount. For example, if the tilt amount of optical axis of the objective lens when the objective lens is vertically moved in focus direction Fo is currently allowed to have about ±7.6' in the Ta direction (with light source wavelength of 780 nm), in the case of a optical recording/reproducing apparatus with a light source wavelength of 410 nm, a tilt amount must be restrained to about ±4'.

SUMMARY OF THE INVENTION

Therefore, the present invention is made to solve the aforementioned problems. An object of the present invention is to provide a tilt correction method of a movable portion, a tilt correction method of an objective lens for an optical disk, and an objective lens driving device for an optical disk for correcting a tilt caused when a movable portion is moved, providing accurate recording and reproducing properties even if the movable portion is reduced in size, restraining a resonance peak by suppressing torsional oscillation of an elastic supporting member for signals in focusing and tracking directions, and providing stable driving control of the objective lens driving device.

In the tilt correction method of the movable portion according to the present invention, the movable portion and a fixed portion are connected by a plurality of elastic supporting members, the movable portion is displaceably provided in the direction orthogonal to the longitudinal direction of the elastic supporting member (hereinafter referred to as the orthogonal direction), and a tilt of the movable portion caused when the movable portion is moved in the orthogonal direction is corrected. By varying expansion/contraction amounts of the plurality of elastic supporting members when the movable portion is moved in the orthogonal direction, the tilt of the movable portion is corrected.

In the above mentioned invention, preferably, each of the plurality of elastic supporting members has at least one bent portion. By varying expansion/contraction amounts of the bent portions of respective elastic supporting members when the movable portion is moved, the tilt of the movable portion is corrected.

According to the tilt correction method of the movable portion of the present invention, unlike the conventional case where a tilt of a movable portion is caused by a moment produced on the movable portion due to deflection of the elastic supporting member when the movable portion is moved in the orthogonal direction, the provision of the bent portion in the orthogonal direction of the movable portion provides expansion/contraction of the elastic supporting member in the direction against the moment, i.e., the direction offsetting the moment, whereby the tilt of the movable portion can be minimized.

According to the tilt correction method of an objective lens for an optical disk of the present invention, a movable portion holding an objective lens, a fixed portion, and a plurality of elastic supporting members connecting the movable portion and fixed portion and elastically supporting the movable portion in a manner displaceable at least in the focus direction are provided. A tilt of the movable portion caused with movement in the focus direction is corrected. The elastic supporting member has at least one bent portion which is bent approximately in the focus direction. The bent portions of the elastic supporting members positioned in parallel in the focus direction are adjusted to provide expansion/contraction of the elastic supporting members in the direction offsetting a moment caused by the deflection of the elastic supporting member.

According to the tilt correction method of the objective lens for the optical disk, a tilt caused in the focus direction of the objective lens due to the moment produced on the movable portion caused by the deflection of the elastic supporting member as a result of movement in the focus direction of the optical axis of the objective lens can be minimized by expansion/contraction of the elastic supporting members caused in the direction against the moment, i.e., the offsetting direction, by the bent portions extending approximately in the focus direction and toward neighboring elastic supporting members.

The objective lens driving device for an optical disk of the present invention is provided with a movable portion holding an objective lens, a fixed portion, and a plurality of elastic supporting members connecting the movable portion and fixed portion and elastically supporting the movable portion in a manner displaceable at least in the focus direction. The device is provided with a correction controlling unit for correcting a tilt of the movable portion caused when the movable portion is moved in the focus direction by adjusting deflections of elastic supporting members arranged in parallel in the focus direction to cause expansion/contraction of the elastic supporting members in the direction offsetting moments caused by the deflections of the elastic supporting members.

With this objective lens driving device for optical disk, although a tilt of the objective lens is caused in the focus direction due to a moment of the movable portion produced by the deflection of the elastic supporting member, by adjusting deflections of neighboring elastic supporting members provided approximately in the focus direction to cause expansion/contraction of the elastic supporting members in the direction against the moment, i.e., in the offsetting direction, the tilt of the objective lens can be minimized in the focus direction.

As the movable portion is reduced in thickness, i.e., the interval between the elastic supporting members arranged in parallel in the focus direction decreases, the tilt of the objective lens in the focus direction increases. However, the tilt of the objective lens can be corrected as described above and the interval between the elastic supporting members can be reduced. As a result, the device can be reduced in thickness and size.

In the above described invention, preferably, the elastic supporting member has at least one bent portion approximately in the focus direction for adjustment of deflection.

With this structure, although a tilt is caused to the movable portion due to a moment produced on the movable portion caused by deflection of the elastic supporting member when the movable portion is moved approximately in the focus direction, the bent portion which is bent approximately in the focus direction of the movable portion causes expansion/contraction of the elastic supporting member in the direction against the moment, i.e., offsetting direction, whereby the tilt of the movable portion can be minimized.

In the above described invention, two elastic supporting members arranged in parallel approximately in the focus direction are symmetric about a surface perpendicular to the focus direction.

In the above described invention, preferably, two elastic supporting members arranged in parallel approximately in the focus direction have an inclined portion.

With this structure, expansion/contraction of the elastic supporting member at the bent portion and expansion/contraction of the elastic supporting member at the inclined portion are caused in the opposite directions, considerable expansion/contraction of the elastic supporting member at the bent portion can be offset by the inclined portion. Thus, the bent portion is allowed to have a sufficient bending length, thereby facilitating provision of a damper material which suppresses vibration of the elastic supporting member. As a result, a resonance peak can be restrained.

In the above described invention, preferably, two elastic supporting members arranged in parallel approximately in the focus direction have a bent portion which is bent approximately in the tracking direction.

With this structure, a sufficient damping effect is obtained at the bent portion which is bent in the tracking direction. Further, the tilt of the optical axis the objective lens can be corrected at the bent portion which is bent in the focus direction, whereby an effect similar to the above mentioned effect can be obtained.

In the above described invention, preferably, two elastic supporting members arranged in parallel approximately in the focus direction both have bent portions generally in a shape of a square with one side opened.

With this structure, although expansions/contractions are caused in opposite directions, since two elastic supporting members both have a bent portion generally in a shape of a square with one side opened, a greater amount of expansion/contraction is caused at the bent portion in the position where a deflection angle of the elastic supporting member is greater. Thus, the tilt of the objective lens in the focus direction can be corrected and a bending length can be set to produce a sufficient damping effect. Further, the device can be reduced in thickness by reduction of intervals between the elastic supporting members as described above.

In the above described invention, preferably, the elastic supporting members arranged in parallel approximately in the focus direction are provided with the above mentioned bent portions at the same position from the fixed portion, where the bent portion has a different bending length.

In the above described invention, preferably, the elastic supporting members arranged in parallel approximately in the focus direction are provided with the above-mentioned bent portions at different positions from the fixed portion, where the bent portion has the same bending length.

With this structure, the elastic supporting members arranged in parallel approximately in the focus direction have bent portions bending in the same direction with differing bending lengths. The greater bending length provides greater amount of expansion/contraction. Thus, when the objective lens is moved in the focus direction, the elastic supporting member on the side opposite the disk contracts by a greater amount when the objective lens is moved toward the disk in the focus direction, and the elastic supporting member positioned on the disk side contracts by a greater amount when the objective lens is moved toward the side opposite the disk in the focus direction.

As a result, expansion/contraction of the elastic supporting member is caused in the direction against the moment caused by deflection of the elastic supporting member, i.e., the offsetting direction, so that the tilt of the objective lens optical axis can be minimized as described above, and the movable portion can be reduced in thickness in size, facilitating provision of a damping material which suppresses vibration of the elastic supporting member. Thus, a resonance peak can be restrained.

By varying bending positions of the bent portions which are bent in the same direction of the elastic supporting members arranged in parallel in the optical axis direction, the bent portion at a position with a greater deflection angle is subjected to a greater amount of expansion/contraction. Thus, when the objective lens is moved in the focus direction, the elastic supporting member positioned on the side opposite the disk contracts by a greater amount when the objective lens is moved toward the disk in the focus direction, and the elastic supporting member positioned on the disk side contracts by a greater amount when the objective lens is moved toward the side opposite the disk in the focus direction.

As a result, expansion/contraction of the elastic supporting member is caused in the direction opposite the moment, i.e., the offsetting direction, whereby the tilt of the optical axis of the objective lens can be minimized as described above, and the movable portion can be reduced in thickness and size, facilitating provision of a damper material which suppresses vibration of the elastic supporting member. Thus, a resonance peak can be restrained.

In the above described invention; preferably, the elastic supporting member is provided in such a way that a straight line connecting the fixing positions on the movable portion and fixed portion sides is approximately in parallel with the disk surface.

With the above described structure, the elastic supporting members positioned in parallel in the optical axis direction are asymmetric about a surface perpendicular to the focus direction. Thus, although a certain amount of tilt of the objective lens optical axis may be inevitably caused when the objective lens is moved in the tracking direction, such tilt can be minimized by setting a straight line connecting the fixing positions on the movable portion and fixed portion sides to be approximately in parallel with the disk surface.

In the above described invention, preferably, an arm portion and a protruding portion of free ends of the elastic supporting member are connected through a damper material near the above mentioned at least one bent portion of the elastic supporting member.

In the above described invention, preferably, the movable portion is supported in a manner displaceable approximately in the radial direction, where the displacement in the radial direction is rotation approximately about a center of gravity.

With the above described structure, a tilt correction effect can be produced as described above during focus movement. In addition, since movement in the tracking direction is made by rotation, when movements in the tracking and focus directions are simultaneously made, positional displacement does not occur between a power point of focus movement and a center of gravity. Thus, the objective lens may not tilt due to a moment caused by positional displacement of the power point and center of gravity. Consequently, the tilt of the objective lens can be minimized during movements are simultaneously made in the focus and tracking directions, not to mention during focus and radial movements.

More preferably, the elastic supporting member is provided as inwardly inclined from the fixed portion side toward the movable portion side.

With the above described structure, when an empty weight is applied in the tracking direction, the effect of an empty weight drop of the objective lens can be minimized because of a considerable empty weight drop of the bent portion. Thus, when used for a portable device, a current consumption for positioning the lens can be minimized, so that a power consumption can also be minimized.

With the above described structure, a simple structure formed solely of the elastic supporting member can suppress vibration in the focusing and tracking directions and torsional oscillation of the elastic supporting member, so that a resonance peak can be restrained.

In the optical recording/reproducing apparatus of the present invention, the objective lens driving device for the optical disk is used as a device for recording, reproducing and erasing optical information.

In the above described invention, preferably, the optical recording/reproducing apparatus records, reproduces, and erases optical information with use of a light source of a short wavelength of violet or blue.

With the above described structure, the tilt in the focusing direction can be minimized during movement of the objective lens, so that light spots are favorably and accurately recorded and reproduced with respect to the disk. Even when the light source of a short wavelength of about 400 nm is used, light spots can be favorably and accurately recorded and reproduced with respect to the disk and vibration of the elastic supporting member can be suppressed. As a result, a more stable servo property is obtained. In addition, the overall size of the apparatus can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 33A and 33B are diagrams showing four beams mounted in parallel in the prior art structure, where 33A shows that an objective lens is not moved in the tracking direction, i.e., positioned at the center, and 33B shows that the objective lens is moved in the tracking direction (in the left direction indicated by an arrow in the drawing).

DESCRIPTION OF THE PREFERRED EMBODIMENTS

First of all, the concept of the present invention will be described with reference to the drawings and mathematical expressions.

Figure 1:
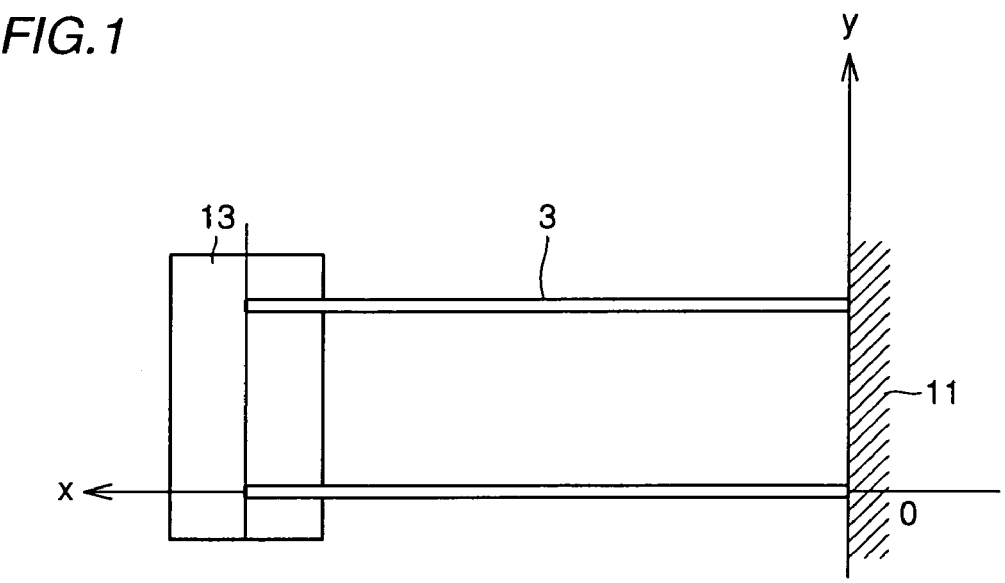
FIGS. 1 to 3 are first to third diagrams of a movable portion 13 supported by elastic supporting members 3 and a fixed portion 11 shown in conjunction with an underlying concept of the present invention.
Figure 2:
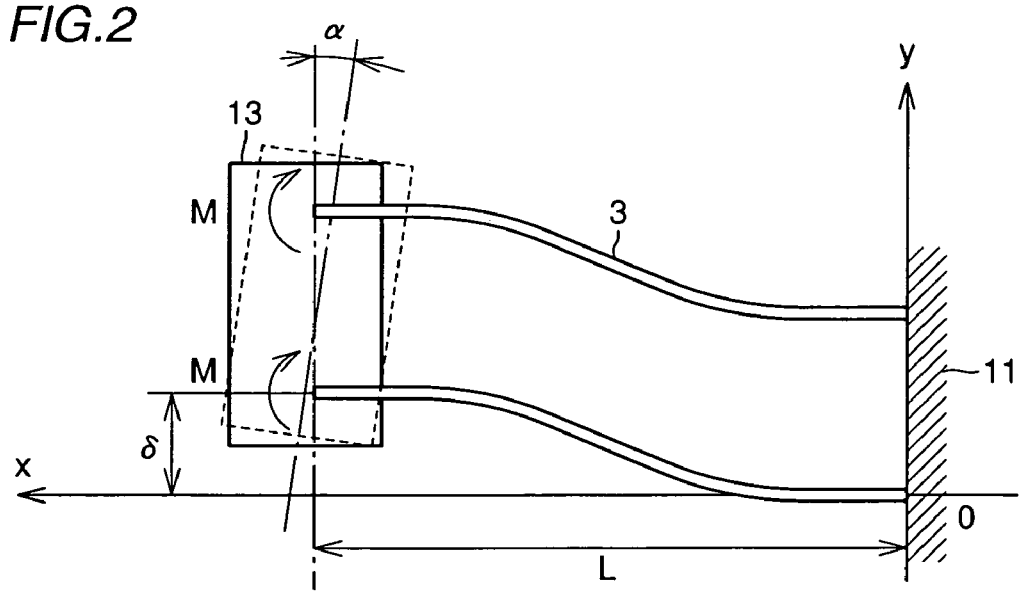

FIGS. 1 and 2 show that a movable portion 13 is supported by elastic supporting members 3 and fixed portion 11. In FIG. 1, movable portion 13 is supported by two parallel elastic supporting members 3. FIG. 2 shows that movable portion 13 is displaced by δ in the y direction.

Referring to FIGS. 1 and 2, a moment M is produced around each elastic supporting member 3. As a result, movable part 13 is inclined by α. Here, a moment produced on movable portion 13 will be considered. First of all, the x axis is defined in parallel with elastic supporting member 3 in the direction orthogonal to the longitudinal direction of elastic supporting member 3, the y axis is defined perpendicular to the x axis, and the length of elastic supporting member 3 is defined as L. Further, the moment, deflection angle and deflection amount when movable portion 13 is displaced by δ are calculated.

Note that E is Young's modulus, F is shear force, M is moment, I is cross sectional secondary moment of elastic supporting member, i is deflection angle, y is deflection amount, and C1–C4 are constants.

Based on the balance relationship, the following equations can be derived.

$$EI\frac{d^3y}{dx^3} = F = C1 \quad (1)$$

$$EI\frac{d^2y}{dx^2} = M = C1 \cdot x + C2 \quad (2)$$

$$EI\frac{dy}{dx} = i = \frac{1}{2}C1 \cdot x^2 = C2 \cdot x + C3 \quad (3)$$

$$EIy = \frac{1}{6}C1 \cdot x^3 + \frac{1}{2}C2 \cdot x^2 + C3 \cdot x + C4 \quad (4)$$

If a boundary condition is x=0, then y=0 and dy/dx=0. If x=L, then y=δ and dy/dx=0. Thus, shear force F, moment M, deflection angle i and deflection amount y are expressed as follows.

$F=12EI\delta/L^3$ $M=6EI\delta(2x-L)/L^3$ $i=6\delta x(L-x)/L^3$ $y=\delta x^2(3L-2x)/L^3 \quad (5)$ As shown in FIG. 2, at the position where x=L, i.e., at the position where elastic supporting member 3 is fixed to movable portion 13, moment M (6EIδ/L12) of elastic supporting member 3 is applied clockwise to movable portion 13, whereby movable portion 13 is inclined as shown by a chain-dotted line in the drawing.

Here, the concept of the present invention is that inclination by angle δ by moment M of movable portion 13 is offset by changing the length of each elastic supporting member 3 in the x direction, i.e., by changing the expansion/contraction amount of each elastic supporting member 3 in the x direction.

Figure 3:
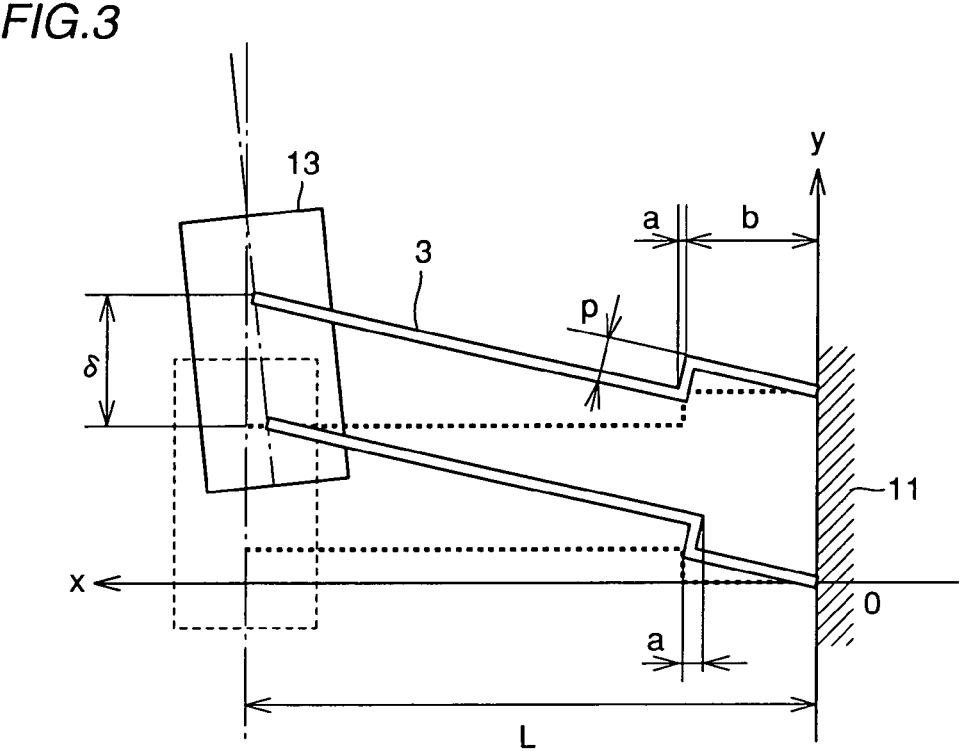

By way of example, FIG. 3 shows elastic supporting member 3 provided with a bent portion in the y axis direction. Moment M is offset by varying length of the bent portion of elastic supporting member 3 in the x direction. Namely, with the bending length of p, if a displacement amount of elastic supporting member 3 is δ, the length of the bent portion in the x direction at upper elastic supporting member 3 would be greater by a=p·sin(i). The length of the bent portion at lower elastic supporting member 3 in the x direction is smaller by a=p·sin(i). Here, deflection angles i refer to deflection angles at the position where x=b. By thus varying the lengths of elastic supporting members 3 during movement of movable portion 13, moment M applied to movable portion 13 is offset and tilt of movable portion 13 can be corrected. Based on the above described concept of the present invention, the embodiments of an objective lens driving device for an optical disk will be described in detail.

First Embodiment

Figure 4:
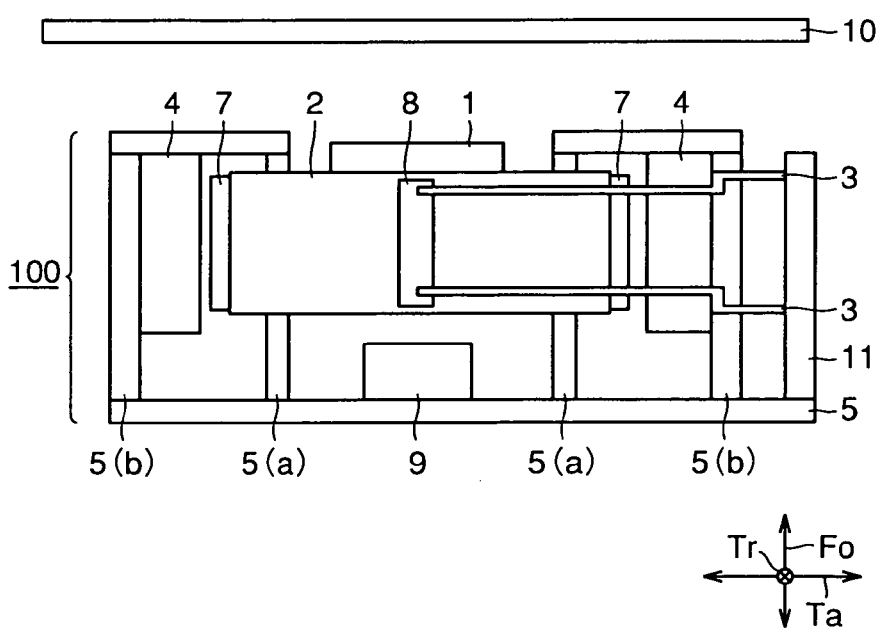
FIG. 4 is a side view schematically showing an objective lens driving device for optical disk 100 according to a first embodiment of the present invention.

Referring to FIG. 4, the structure of objective lens driving device for optical disk 100 will be described. Note that FIG. 4 is a side view schematically showing an objective lens driving device for optical disk 100 according to a first embodiment of the present invention. An optical disk 10 is shown for clarifying a positional relationship of the device with respect to the optical disk.

Overall Structure of Objective Lens Driving device for Optical Disk 100

Objective lens driving device for optical disk 100 includes: an objective lens 1 of a pickup optical system for an optical disk; a reflection mirror 3 for directing a laser beam to objective lens 1; an objective lens holder 2 for holding objective lens 1 approximately at the center; a pair of hollow focus coils (not shown, having the same structure as the conventional case) provided on side walls of objective lens holder 2; a tracking coils 7 fixed to respective focus coils; and an elastic supporting member 3 of four parallel metal wires supporting objective lens holder 2. Elastic supporting member 3 supports the movable portion including objective lens holder 2 in a manner slightly displaceable in the focus direction Fo and tracking direction Tr orthogonal to the longitudinal direction of elastic supporting member 3.

Further provided are: a mounting member 8 mounting one end of elastic supporting member 3 to objective lens holder 2 and the other end to fixed portion 11 and supplying a current to a driving coil (formed of the focus coil and tracking coil 7); and a magnetic circuit formed of a magnet 4 and yoke 5 for driving objective lens holder 2 in focus direction Fo and tracking direction Tr. Objective lens driving device for optical disk 100 is provided such that objective lens 1 is positioned below a prescribed track of optical disk 10.

The overall structure and driving concept of objective lens driving device for optical disk 100 are similar to those of the prior art, and therefore detailed description of the overlapping portion will not given here.

Structure of Elastic Supporting Member 3

Figure 5:
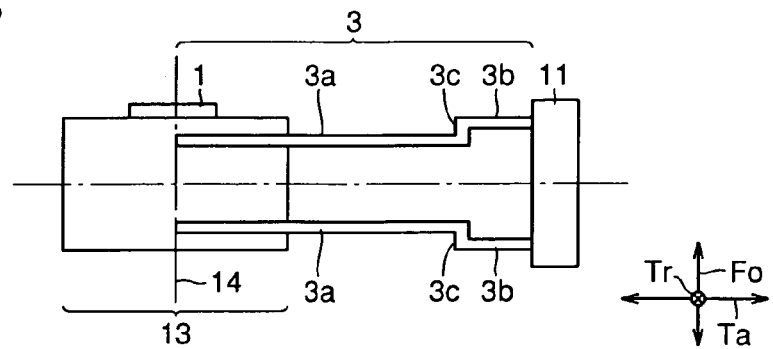
FIG. 5 is a side view of elastic supporting member 3 of objective lens driving device for optical disk 100 according to the first embodiment of the present invention.

Now, the structure of elastic supporting member 3, which is a key portion of the present embodiment, will be described in detail. FIG. 5 is a side view of objective lens driving device for optical disk 100 showing elastic supporting member 3. FIG. 5 shows movable portion 13 formed of objective lens 1, objective lens holder 2, driving coil (not shown) and the like, fixed portion 11, and elastic supporting member 3 connecting movable portion 13 and fixed portion 11.

Elastic supporting member 3 has a bent portion 3c that makes a linear portion 3a extending from movable portion 13 and a linear portion 3b extending from fixed portion 11 placed on different straight lines. Bent portion 3c extends approximately in the optical axis 14 direction from fixed portion 11 and extends in the direction toward neighboring elastic supporting member 3.

Figure 6:
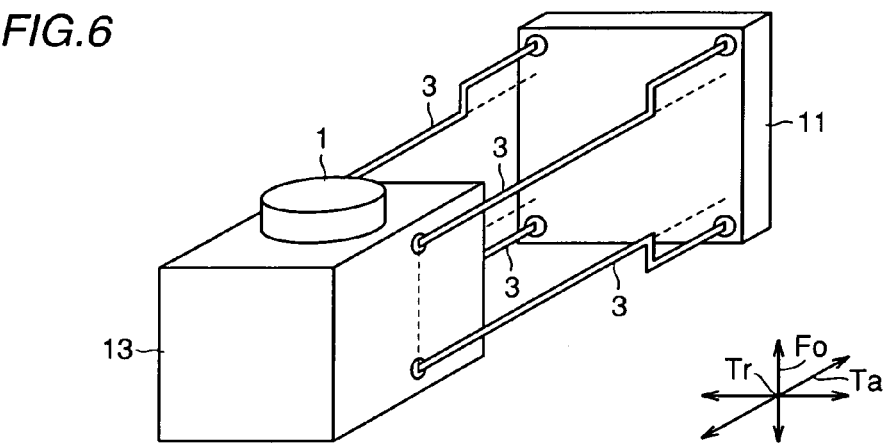
FIG. 6 is a perspective view of elastic supporting member 3 of objective lens driving device for optical disk 100 according to the first embodiment of the present invention.

FIG. 6 is an elevational perspective view of elastic supporting member 3. One example thereof is shown in FIG. 3. Elastic supporting members 3 fixed to fixed portion 11 are on both sides of movable portion 13 to surround a center of gravity of movable portion 13. Elastic supporting members 3 arranged in parallel in the optical axis 14 direction (focus direction Fo) are symmetric about a surface perpendicular to the focus direction. It is also desirable that elastic supporting members 3 arranged in parallel in tracking direction Tr are symmetric about a surface perpendicular to the focus direction.

Deflection of Elastic Supporting Member 3

Figure 7A:
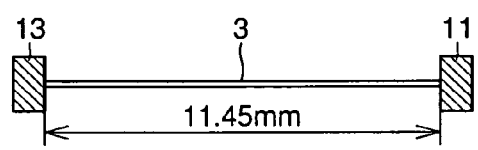
FIGS. 7A and 7B are side views shown in conjunction with deflection of a linear beam supported at both ends.
Figure 7B:
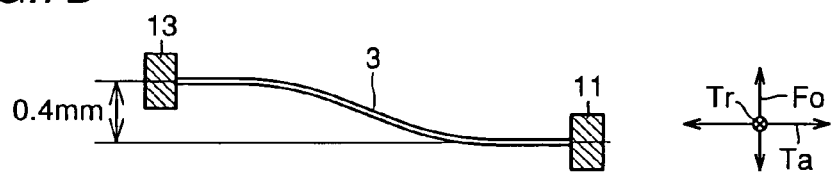

Here, deflection amount of elastic supporting member 3 when objective lens of movable portion 13 is displaced in focus direction Fo will be described. FIG. 7 shows in a side view deflection of elastic supporting member 3 when elastic supporting member 3 is a linear beam supported at both ends. In the drawing, elastic supporting member 3 (having a length of 11.45 mm) in a linear shape without a bent portion has one end fixed to fixed portion 11 and the other end fixed to movable portion 13. FIG. 7A relates to the case where no deformation occurs, and FIG. 7B relates to the case where deformation of elastic supporting member 3 occurs when the objective lens (movable portion 13) is moved by 0.4 mm toward the disk side (upward) in focus direction Fo. The deflection angle of elastic supporting member 3 is determined depending on the position of elastic supporting member 3 in the longitudinal direction.

Figure 8:
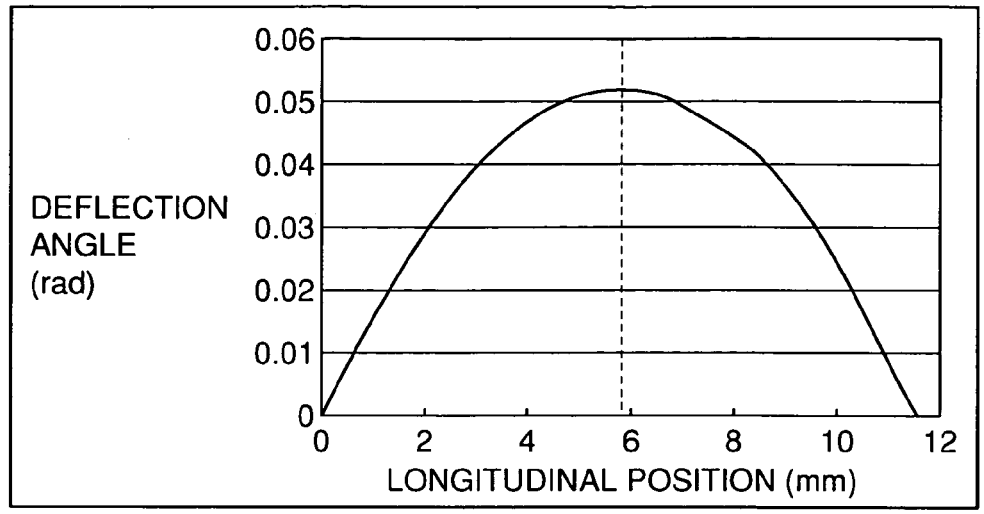
FIG. 8 is a graph showing a relationship between a longitudinal position and a deflection angle of the linear beam of FIG. 7.

FIG. 8 shows a relationship between the longitudinal position (mm) and deflection angle (rad) of a beam (elastic supporting member). A point of 0 in the longitudinal direction of the beam corresponds to the end of elastic supporting member 3 on the movable portion side. A point 11.45 mm in the beam's longitudinal direction correspond to the end of elastic supporting member 3 on the fixed portion side. As shown in FIG. 8, when elastic supporting member 3 is deflexed, deflection angles at both ends of elastic supporting member 3 become 0 and the intermediate point of elastic supporting member 3 attains to a maximum angle.

Figure 9A:
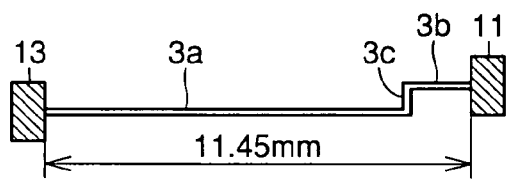
FIGS. 9A and 9B are side views showing a modification of elastic supporting member 3 of objective lens driving device for optical disk 100 according to the first embodiment of the present invention.
Figure 9B:
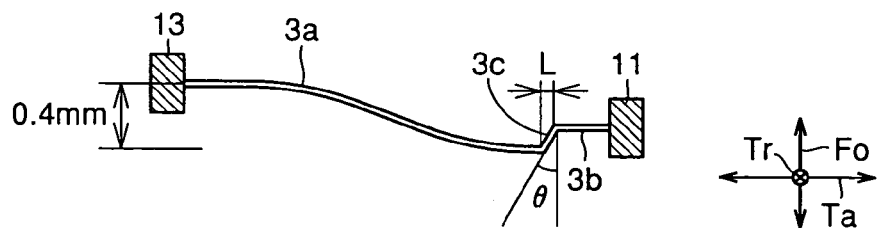

FIG. 9 shows in a side view deflection of elastic supporting member 3 when the objective lens (driving member) of elastic supporting member 3 having a bent portion of the present embodiment is moved in focus direction Fo. The length of 11.45 mm of elastic supporting member 3 includes lengths of linear portions 3a and 3b excluding bent portion 3c. FIG. 9A relates to the case where deformation does not occur. FIG. 9B relates to the case where deformation of elastic supporting member 3 occurs when the objective lens (movable portion 13) is moved by 0.4 mm toward the side of the disk (upward) in focus direction Fo. Linear portions 3a and 3b are subjected to deflection of about the same deflection amount and deflection angle as in the case of FIGS. 7 and 8.

Here, if the deflection angle at the position of bent portion 3c in the longitudinal direction of elastic supporting member 3 is θ, bent portion 3c of FIG. 9 is also inclined by θ. Thus, the inclination of θ of bent portion 3c increases the length of elastic supporting member 3 in the longitudinal direction by L, as compared with FIG. 9A.

Figure 10:
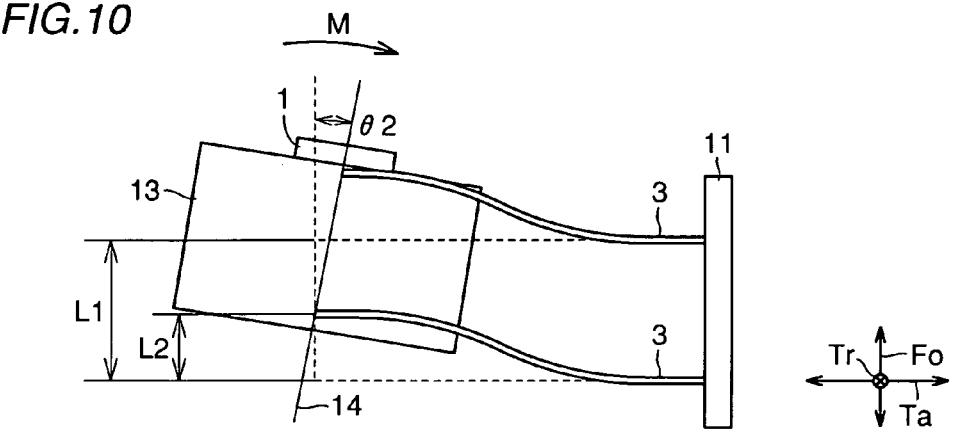
FIG. 10 is a side view of the linear beam used as elastic supporting member 3 during movement of the objective lens.

FIG. 10 shows in a side view deflection of elastic supporting member 3 and movement of the movable portion when linear elastic supporting member 3 free from any bent portion, as shown in FIG. 7, is used. FIG. 10 shows that four parallel linear elastic supporting members 3 have one ends fixed to fixed portion 11 and the other ends fixed to movable portion 13. Elastic supporting member 3 arranged in parallel with the focus direction Fo is fixed with supporting interval L1.

In this state, deformation of elastic supporting member 3 and inclination of optical axis 14 are shown when objective lens 1 (movable portion 13) is moved by a distance L toward the disk (upward) in focus direction Fo. When each elastic supporting member 3 is deflexed as shown by a thick line of FIG. 10, a moment M is applied in the arrow direction (clockwise) to movable portion 13, and optical axis 14 tilts by θ2 toward fixed portion 11 in tangential direction Ta with respect to a straight line perpendicular to the disk. The magnitude of θ2 is affected by L1 and L2, material of elastic supporting member 3 (Young's modulus), amount of expansion/contraction in the longitudinal direction and so on.

Figure 11:
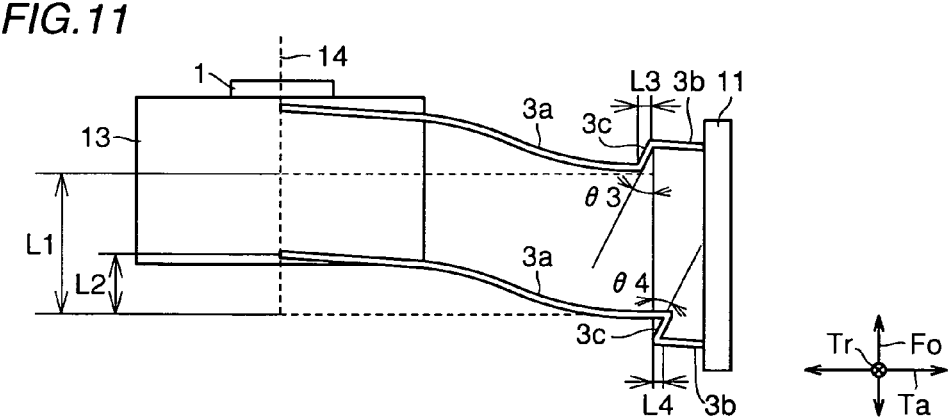
FIG. 11 is a side view of elastic supporting member 3 of objective lens driving device for optical disk 100 according to the first embodiment of the present invention during movement of the objective lens.

FIG. 11 shows in a side view deflection of elastic supporting member 3 and movement of movable portion 11 when elastic supporting member 3 having a bent portion of the present embodiment as shown in FIG. 9 is used. FIG. 11 shows four parallel elastic supporting members 3 each having linear portions 3a, 3b and bent portion 3c. Here, bent portion 3c is bent approximately in the optical axis direction and toward neighboring elastic supporting members 3 as shown by a thick line. Each elastic supporting member 3 has one end fixed to fixed portion 11 and the other end fixed to movable portion 13. The interval of elastic supporting members 3 arranged in focus direction Fo is fixed to L1. In this state, deformation of elastic supporting member 3 and tilt of optical axis 13 when objective lens 1 (movable portion 13) is moved toward the disk (upward) by distance L2 in focus direction Fo are shown.

Function

If deflection angles of upper and lower elastic supporting members 3 in the drawing at the position of bent portions 3c in the longitudinal direction of elastic supporting member 3 are respectively θ3 and θ4, when each elastic supporting member 3 is deflexed as shown by a thick line of FIG. 11, the bent portions of upper and lower elastic supporting members 3 are respectively inclined by θ3 and θ4.

Thus, as compared with the case where deflection occurs when no bent portion is provided, the length of upper elastic supporting member 3 increases in the longitudinal direction by L3, whereas lower elastic supporting member 3 decreases in length in the longitudinal direction by L4. Thus, elastic supporting member 3 expands/contracts to cause tilt in the direction opposite moment M indicated by an arrow of FIG. 10, i.e., toward the side opposite fixed portion 11 in tangential direction Ta. As a result, elastic supporting member 3 acts to offset tilt θ2 of FIG. 10, whereby the tilt of movable portion 13 in tangential direction Ta can be minimized.

Figure 12:
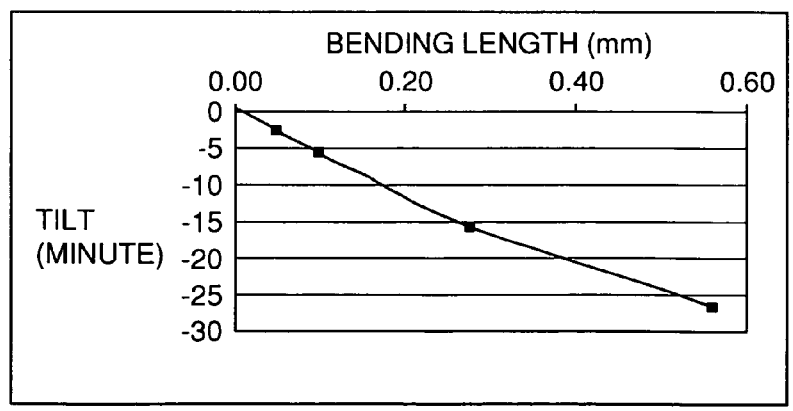
FIG. 12 is a graph showing a relationship between a length and tilt of a bent portion of elastic supporting member 3 of FIG. 11.

For example, each of four elastic supporting members 3 having bent portions 3c as shown in FIG. 11 is formed of a material of beryllium copper, having a total length of 11.45 mm and a bent portion of a bending length of 0–0.56 mm at the position 9.76 mm from the end on the side of the movable portion. In addition, supporting intervals on the movable portion side in focus direction Fo and tracking direction Tr are respectively set to 2.51 mm and 8.26 mm. Then, tilt of the optical axis in tangential direction Ta when the objective lens is moved by 0.4 mm toward the side of the disk (upward) in focus direction Fo was calculated by analysis. The resultant relationship between "length of bending portion" and "tilt" is shown in FIG. 12. Note that (−) and (+) of tilt values respectively represent tilts of optical axis toward the side opposite fixed portion 11 and toward the side of fixed portion 11 in tangential direction Ta.

As can be seen from FIG. 12, by varying the lengths of bent portions, the tilt of the optical axis can be controlled. The greater the bending portion length is, the greater the tilt amount toward (−) side is. This is because elastic supporting member 3 expands/contracts to cause tilt in the direction opposite moment M as indicated by an arrow in FIG. 10, i.e., toward the side opposite fixed portion 11 in tangential direction Ta. Referring to FIG. 12, the provision of a small bending portion having a length of about 0.01 mm can serve to restrain tilt to 0′. However, the length of the bending portion must be set depending on the material, shape, length, supporting interval, position of the bending portion and the like of elastic supporting member 3. In addition to the length of the bent portion, the position of the bent portion may be changed to control tilt.

Figure 13:
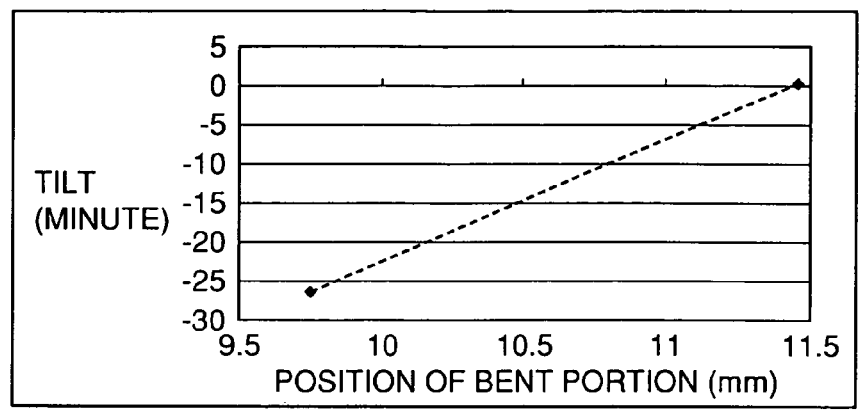
FIG. 13 is a graph showing a relationship between a position and tilt of the bent portion of elastic supporting member 3 shown in FIG. 11.

FIG. 13 shows the analysis result of a relationship between "position of bent portion" and "tilt." This analysis model is obtained with the length of the bent portion set to 0.56 mm as in the above described model of FIG. 12. As previously stated with reference to FIG. 8, since the deflection angle varies according to the position of the bent portion, the closer the bent portion is to the central portion of elastic supporting member 3 in the longitudinal direction, the expansion/contraction function of elastic supporting member 3 in the longitudinal direction becomes considerable. Thus, expansion/contraction of elastic supporting member 3 is caused to the direction opposite moment M indicated by an arrow of FIG. 10, i.e., toward the side opposite fixed portion 11 in tangential direction Ta. As a result, a tilt amount toward the side of (−) becomes large. Referring to FIG. 13, by setting bent portion 1 at the position around 11.4 mm, tilt can be restrained to 0′. However, the position of the bent portion can be set to enable control depending on the material, shape, length, supporting interval, length of bent portion and the like of elastic supporting member 3.

Effect

As described above, conventionally, tilt of optical axis 14 of objective lens 1 varies according to moment M applied to movable portion 13 due to deflection of elastic supporting member 3 during movement of movable portion 13 in focus direction Fo. However, the provision of the bent portion bending approximately in the optical axis direction and toward neighboring elastic supporting member 3 in movable portion 13 causes expansion/contraction of elastic supporting member 3 in the direction opposite moment M, i.e., in the offsetting direction, whereby the tilt of optical axis 14 of objective lens 1 can be minimized.

Further, as the movable portion is reduced in thickness, i.e., as the interval between elastic supporting members 3 arranged in parallel in the optical axis direction, tilt of optical axis 14 of objective lens 1 becomes greater. However, the tilt of objective lens 1 can be corrected to enable reduction in thickness and size of a device.

First Modification

Structure

Figure 14:
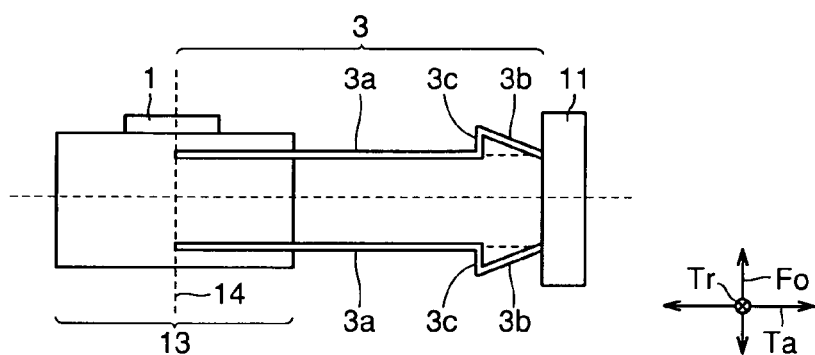
FIG. 14 is a side view showing a first modification of elastic supporting member 3 of objective lens driving device for optical disk 100 according to the first embodiment of the present invention.
Figure 15:
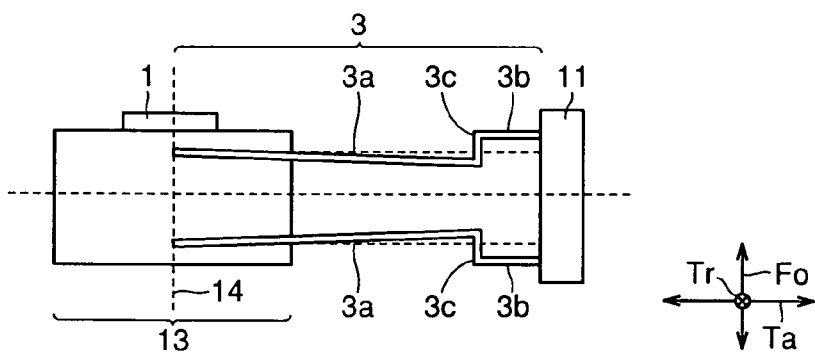
FIG. 15 is a side view showing another exemplary first modification of elastic supporting member 3 of objective lens driving device for optical disk 100 according to the first embodiment of the present invention.

FIG. 14 is a side view showing a first modification of elastic supporting member 3 of the above described objective lens driving device for optical disk 100. FIG. 15 shows a side view of another example according to the first modification. As shown in FIGS. 14 and 15, the distance between upper and lower elastic supporting members 3 arranged in parallel in the direction of optical axis 14 form a slop portion that increases in the direction of optical axis 14 from fixed portion 11 toward movable portion 13. L1 near portions 3b and 3a correspond to the slope portion respectively in FIGS. 14 and 15.

Here, the function of elastic supporting member 3 (thick solid line) of FIG. 15 when objective lens 1 is moved toward the disk (upward) in focus direction Fo will be described with reference to the side view of FIG. 16.

Figure 16A:
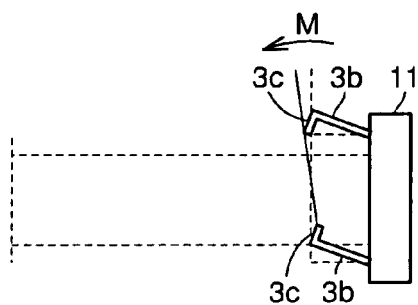
FIGS. 16A and 16B are side views shown in conjunction with deformation of elastic supporting member 3 during movement of the optical disk of FIG. 15.
Figure 16B:
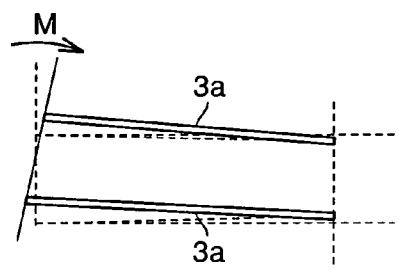

FIG. 16A shows only a portion of elastic supporting member 3 of FIG. 15 including linear portions 3b and bent portion 3c extending from fixed portion 11. FIG. 16B shows a portion of elastic supporting member 3 of FIG. 15 that includes only linear portion 3a.

Function and Effect

As shown in FIG. 16A, the bent portion is inclined along a linear deflection angle. Thus, upper elastic supporting member 3 in FIG. 16A extends in the longitudinal direction and lower elastic supporting member in the drawing contracts in the longitudinal direction, whereby a straight line connecting leading edges of the bent portions are inclined in the direction indicated by an arrow of FIG. 16A (counterclockwise).

As shown in FIG. 16B, if the upper and lower elastic supporting members 3 are provided to have a slope portion that increases in the direction of optical axis 14 from fixed portion 11 toward movable portion 13, upper and lower elastic supporting members 3 in the drawing respectively expands and contracts in the longitudinal direction, whereby a straight line connecting the leading edges of linear portion 3a is inclined in the direction indicated by an arrow in FIG. 16B (clockwise).

By setting bent portion 3c such that the tilt of the bent portion (FIG. 16A) is greater than that of the slope portion (FIG. 16B), expansion/contraction of elastic supporting member 3 is caused in the direction opposite moment M (FIG. 10), i.e., in the offsetting direction, during movement in focus direction Fo. As a result, the tilt of optical axis 14 of objective lens 1 can be minimized.

Further, the tilt shown in FIG. 16B can offset the tilt shown in FIG. 16A, so that bent portion 3c is allowed to have a greater length. Accordingly, the length of bent portion 3c becomes sufficiently large, thereby facilitating provision of a damper member that suppresses vibration of elastic supporting member 3. As a result, a resonance peak can be restrained.

In addition, the above mentioned function and effect can be produced in the case of a structure in which linear portion 3b has a slope portion as shown in FIG. 14. By setting bent portion 3c such that the tilt of the bent portion is greater than that of the slope portion, expansion/contraction of elastic supporting member 3 is caused in the direction opposite moment M, i.e., in the offsetting direction, during movement in focus direction Fo. As a result, the tilt of optical axis 14 of objective lens 1 can be minimized. Further, the tilt of bent portion 3c can be offset by the tilt of the slop portion, so that bent portion 3c is allowed to have a greater length. Accordingly, the length of bent portion 3c becomes sufficiently large, thereby facilitating provision of a damper member that suppresses vibration of elastic supporting member 3. As a result, a resonance peak can be restrained.

In the case where both of linear portions 3a and 3b of elastic supporting member 3 have a slope portion, by providing bent portion 3c such that tilt of bent portion 3c is greater than a total tilt amount of linear portions 3a and 3b having the slope portion, the above described effect can be produced.

Second Modification

Structure

Figure 17A:
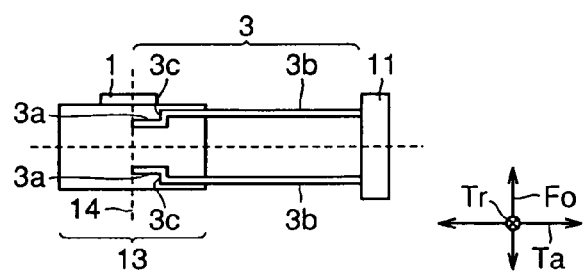
FIGS. 17A and 17B are side views showing a second modification of elastic supporting member 3 of objective lens driving device for optical disk 100 according to the first embodiment of the present invention.

FIG. 17 shows a second modification of elastic supporting member 3 in objective lens driving device for optical disk 100. As shown in FIG. 17, elastic supporting member 3 additionally has a bent portion bending approximately in tracking direction Tr, so as to produce an effect similar to that of the above described objective lens driving device for optical disk 100. FIG. 17A is a side view and 17B is a plan view when seen from the disk side.

Figure 17B:
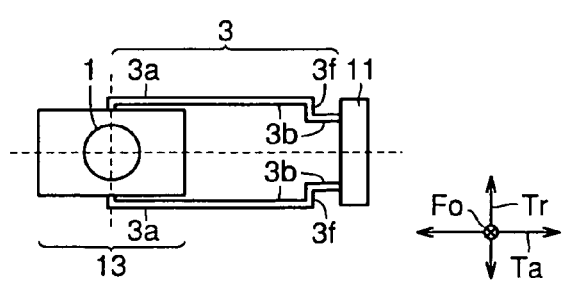

As shown in FIGS. 17A and 17B, each elastic supporting member 3 has linear portions 3a, 3b, bent portion 3c bending approximately in the direction of optical axis 14 and toward neighboring elastic supporting members 3, and a bent portion 3f bending approximately in tracking direction Tr. In this configuration, bent portion 3c is provided such that bent portion 3f offsets greater tilt in the direction of moment M (tilt toward fixed portion 11 in tangential direction Ta) by tilt (tilt in the direction opposite fixed portion 11 in tangential direction Ta) of bent portion 3c.

Function and Effect

Thus, expansion/contraction of elastic supporting member 3 is caused in the direction opposite moment M, i.e., in the offsetting direction, during movement of movable portion 10 in focus direction Fo, whereby tilt of optical axis 14 of the objective lens can be minimized. Further, bent portion 3f may have a sufficiently large length, thereby facilitating provision of a damper material that suppresses vibration of elastic supporting member 3. Thus, a resonance peak can be restrained.

The above described elastic supporting member 3 shown in FIG. 17 can be manufactured by forming a structure having linear portions 3a and 3b and bent portion 3f which is bent in tracking direction Tr by means of etching or the like, and then bending linear portion 3a to form bent portion 3c which is bent from fixed portion 11 approximately in the direction of optical axis 14 and toward neighboring elastic supporting member 3.

Alternatively, elastic supporting member 3 may be manufactured by forming a structure having linear portions 3a, 3b and bent portion 3c by etching or the like and then bending linear portion 3b to provide bent portion 3f which is bent in tracking direction Tr.

Third Modification

Structure

Figure 18:
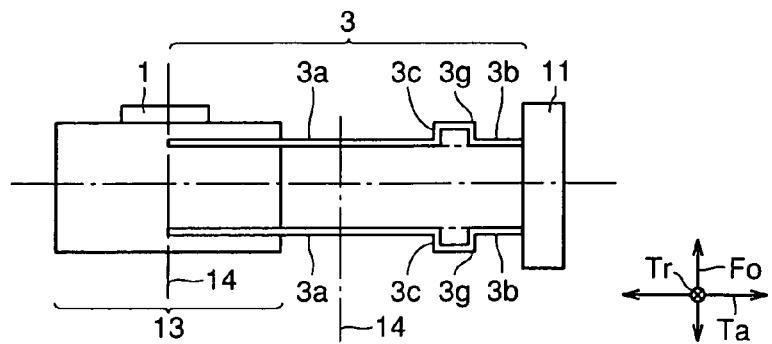
FIG. 18 is a side view of a third modification of elastic supporting member 3 of objective lens driving device for optical disk 100 according to the first embodiment of the present invention.
Figure 19:
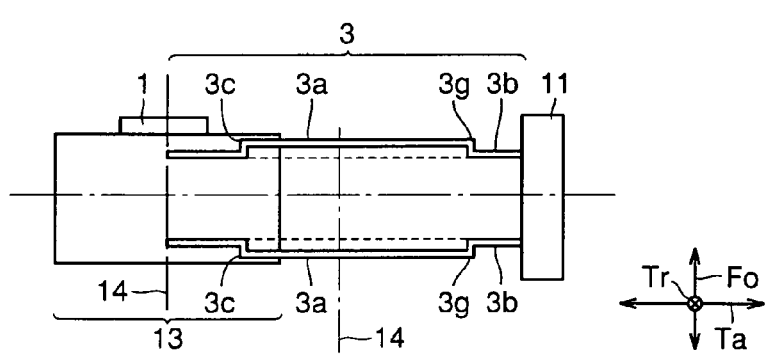
FIG. 19 is a side view of another exemplary third modification of elastic supporting member 3 of objective lens driving device for optical disk 100 according to the first embodiment of the present invention.

FIG. 18 shows a third modification of elastic supporting member 3 in objective lens driving device for optical disk 100. Another example of the third modification is shown in FIG. 19. As shown in FIGS. 18 and 19, elastic supporting member 3 includes linear portions 3a, 3b and bent portion 3c which is bent from fixed portion 11 approximately in the direction of optical axis 14 and toward neighboring elastic supporting member 3. It further has a second bent portion 3g which is bent from fixed portion 11 approximately in the direction of optical axis 14 and toward neighboring elastic supporting member 3 at the position where a deflection angle (a deflection angle when objective lens 1 is moved) of elastic supporting member 3 is smaller than that of a bent portion 3c.

Function and Effect

Figure 20:
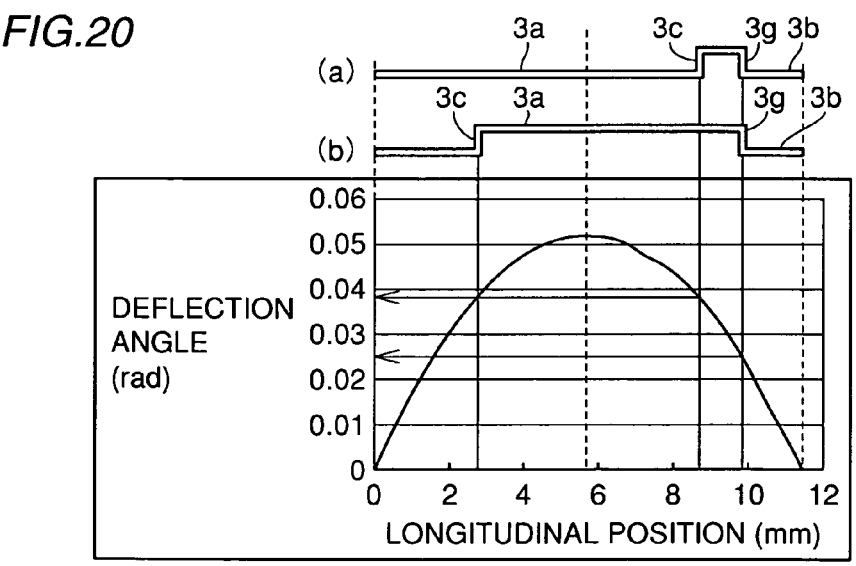
FIG. 20 is a graph showing a relationship between a longitudinal position and deflection angle of a bent portion of elastic supporting member 3 shown in FIGS. 18 and 19.

Elastic supporting member 3 having the above described structure can minimize tilt of optical axis 14 of objective lens 1 as in the case of the previously described each elastic supporting member 3. Here, the graph of FIG. 20 shows a relationship between the position in the longitudinal direction and a deflection angle of the linear beam shown in FIG. 8. FIGS. 20A and 20B respectively relate to upper elastic supporting members 3 of FIGS. 18 and 19, showing a relationship between bent portions 3c, 3g of each elastic supporting member 3 and a deflection angle.

FIGS. 20A and 20B respectively relates to bent portions 3c and 3g. It can be seem that the bending position of bent portion 3c is at the position where a deflection angle is greater than that of bent portion 3g. In this configuration, expansions/contractions are caused in the opposite directions since bent portions 3c and 3g are bent in the opposite directions from fixed portion 11. As a result, bending portion 3c that is positioned at the portion where the deflection angle of elastic supporting member 3 is greater produces a greater effect of expansion/contraction. Thus, upper and lower elastic supporting members 3 act in the same manner, so that the tilt of optical axis 14 of objective lens 1 can be corrected. In addition, since tilt of bent portion 3c can be offset by that of bent portion 3g, the bending length that is enough to produce a sufficient damping effect can be ensured. Further, the distance between elastic supporting members 3 can be further reduced as in the above described case, thereby enabling reduction in thickness of the device.

Fourth Modification

Structure

Figure 21:
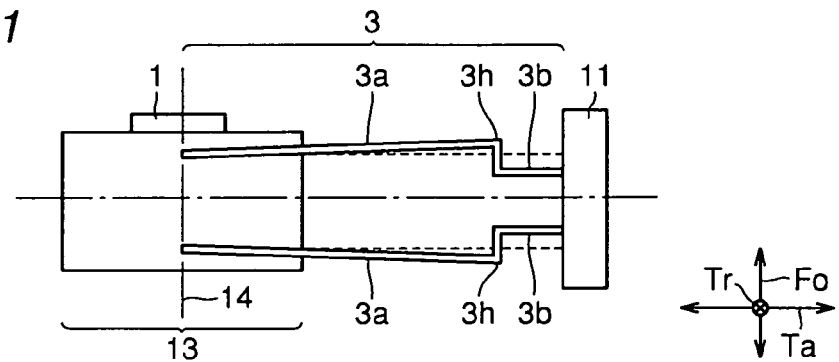
FIG. 21 is a side view showing a fourth modification of elastic supporting member 3 of objective lens driving device for optical disk 100 according to the first embodiment of the present invention.

FIG. 21 shows a fourth modification of elastic supporting member 3 in the objective lens driving device for optical disk. At least one pair of elastic supporting members 3 are arranged in parallel in the direction of optical axis 14 of objective lens 1. Elastic supporting member 3 has a bent portion 3h bending approximately in the direction of optical axis 14 from fixed portion 11 toward the side opposite neighboring elastic supporting member 3. Elastic supporting members 3 positioned in parallel in the direction of optical axis 14 are symmetric about a surface perpendicular to the focus direction. The distance between elastic supporting members 3 decreases from the fixed portion side toward the movable portion side in the direction of optical axis 14, forming linear portion 3a with a slope.

Function and Effect

As in the above described each elastic supporting member 3, elastic supporting member 3 of the fourth modification can minimize tilt of optical axis 14 of objective lens 1.

In this configuration, bent portion 3h is provided such that tilt of linear portion 3a having a slope is greater than that of bent portion 3h. Thus, expansion/contraction of elastic supporting member 3 is caused in the direction opposite moment M, i.e., in the offsetting direction, during movement of movable portion 13 in focus direction Fo, whereby tilt of optical axis 14 of the objective lens can be minimized.

Further, since the tilt of bent portion 3h can be offset by that of linear portion 3a, bent portion 3h is allowed to have a sufficiently large length. As a result, provision of a damper material that suppresses vibration of elastic supporting member 3 is facilitated and a resonance peak can be restrained.

Note that the above described function and effect are not limited to the case where linear portion 3a of elastic supporting member 3 has a slope. The similar effect can be produced when linear portion 3b has a slope portion or both of linear portions 3a and 3b have slope portions if bent portion 3h and the slope portions are adjusted such that tilt of linear portion 3a with the slope is greater than that of bent portion 3h.

Fifth Modification

Structure

Figure 22:
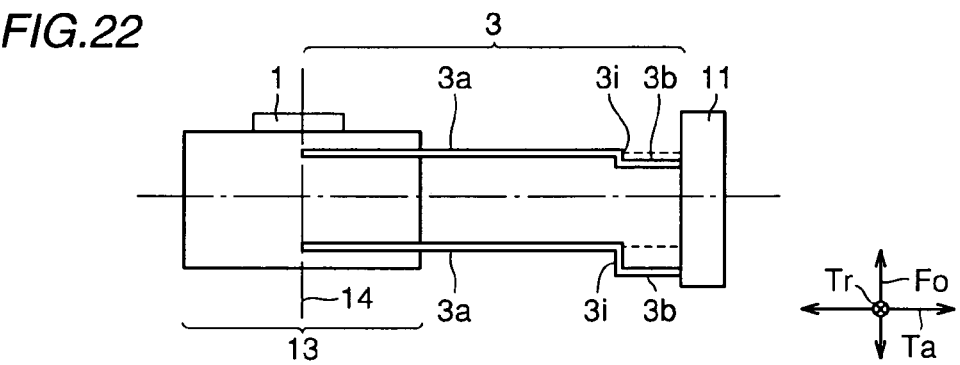
FIG. 22 is a side view showing a fifth modification of elastic supporting member 3 of objective lens driving device for optical disk 100 according to the first embodiment of the present invention.

FIG. 22 shows a fifth modification of elastic supporting member 3 in objective lens driving device for optical disk 100. As shown in FIG. 22, at least one pair of elastic supporting member 3 are arranged in parallel in the direction of optical axis 14 of objective lens 1, each elastic supporting member 3 positioned in the direction of optical axis 14 has a bent portion 3i which is bent from fixed portion 11 approximately in the direction of optical axis 14 and in the direction toward the optical disk. Bent portion 3i of elastic supporting member 3 that is closer to the disk (elastic supporting member 3 on the upper side of the drawing) is shorter in length.

Function and Effect

Elastic supporting member 3 having the above described configuration can minimize tilt of optical axis 14 of objective lens 1 as in the case of the above described elastic supporting member 3. Bent portion 3i of lower elastic supporting member 3 that is bent in the same direction from fixed portion 11 is made longer. For example, when objective lens 1 is moved toward the disk (upward) in focus direction Fo, lower elastic supporting member 3 contracts to a large extent in the longitudinal direction. As a result, expansion/contraction of elastic supporting member 3 is caused in the direction opposite moment M due to deflection of elastic supporting member 3, i.e., in the offsetting direction. Thus, tilt of optical axis 14 of objective lens 1 can be minimized.

To give details of FIG. 22, for example, each elastic supporting member 3 is formed of a beryllium copper. Elastic supporting member 3 has a total length of 11.45 mm. Bent portion 3i is positioned 9.76 mm from the end on the side of movable portion 13, and the longer bending portion has a fixed length of 0.56 mm. The supporting interval on the side of movable portion 13 in focus direction Fo is 2.91 mm and that in tracking direction Tr is 8.26 mm.

Figure 23:
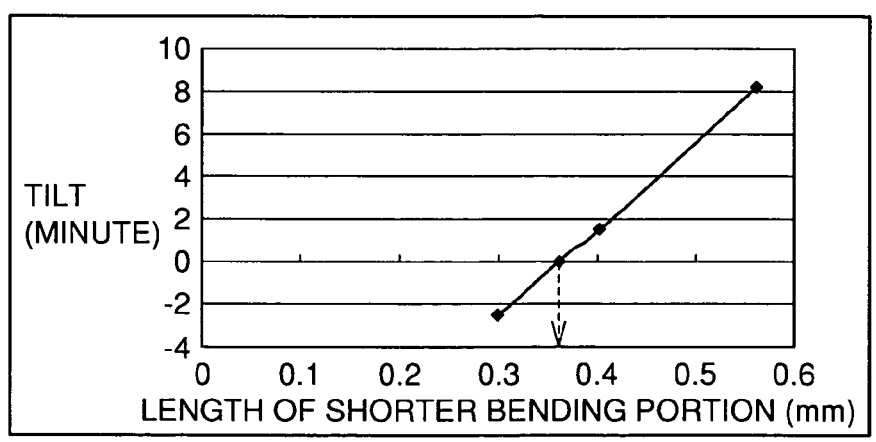
FIG. 23 is a graph showing a relationship between a length of a shorter (upper) bent portion and an optical axis tilt of elastic supporting member 3 shown in FIG. 22.

FIG. 23 shows a result obtained by analysis with this structure for optical axis tilt in tangential direction Ta when objective lens 1 is moved toward the disk (to the upper side) by 0.4 mm in focus direction Fo. In FIG. 23, the abscissa represents "length of shorter bent portion" and the ordinate represents "tilt" of optical axis 14 in tangential direction Ta (tilt values of (+) and (−) respectively represent tilt toward fixed portion 11 and toward the side opposite the fixed portion). As can be seen from FIG. 23, in the above described configuration, the shorter bending length is set to 0.36 mm, so that tilt in tangential direction Ta can be restrained approximately to 0'.

In addition, the distance between elastic supporting members 3 can be reduced to enable reduction in thickness and size of movable portion 13. A bending length that is required for providing a damper material that suppresses vibration of elastic supporting member can be ensured for upper and lower elastic supporting member 3, whereby a resonance peak can be restrained.

Structure

Figure 24:
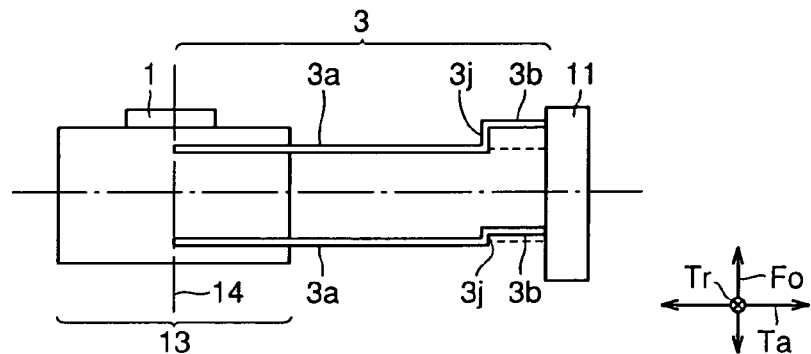
FIG. 24 is a side view showing the fifth modification elastic supporting member 3 of objective lens driving device for optical disk 100 according to the first embodiment of the present invention.

FIG. 24 shows another example of the above described fifth modification. As shown in FIG. 24, at least one pair of elastic supporting members 3 are arranged in parallel in the direction of optical axis 14 of objective lens 1. Each elastic supporting member 3 has a bent portion 3j which is bent approximately in the direction of optical axis 14 from fixed portion 11 and in the direction opposite the disk side. Bent portion 3j of elastic member 3 positioned closer to the disk (an elastic supporting member positioned on the upper side of the drawing) has a greater length.

Function and Effect

Similarly to elastic supporting member 3 shown in FIG. 22, elastic supporting member 3 having the above described structure can minimize tilt of optical axis 14 of objective lens 1. Bent portion 3j of upper elastic supporting member 3 that is bent in the same direction (in the direction opposite the disk) from fixed portion 11 is made longer. For example, when objective lens 1 is moved toward the disk (upward) in focus direction Fo, upper elastic supporting member 3 contracts to a large extent in the longitudinal direction. As a result, expansion/contraction of elastic supporting member 3 is caused in the direction opposite moment M due to deflection of elastic supporting member 3, i.e., in the offsetting direction. Thus, tilt of optical axis 14 of objective lens 1 can be minimized.

Further, since a distance between elastic supporting members 3 can be reduced, reduction in thickness and size of the movable portion is enabled. In addition, a bending length required for providing a damper material that suppresses vibration of elastic supporting member 3 can be ensured for upper and lower elastic supporting members 3, so that a resonance peak can be restrained.

Sixth Modification

Structure

Figure 25:
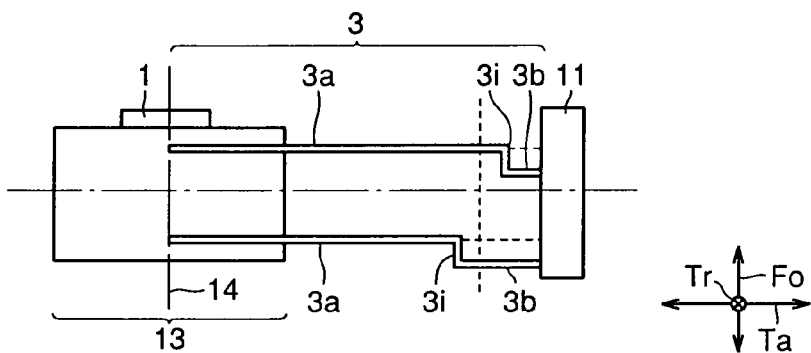
FIG. 25 is a side view showing a sixth modification of elastic supporting member 3 of objective lens driving device for optical disk 100 according to the first embodiment of the present invention.

FIG. 25 shows a sixth modification of elastic supporting member 3 in the objective lens driving device for optical disk. At least one pair of elastic supporting members 3 are arranged in parallel in the direction of optical axis 14 of objective lens 1. Elastic supporting member 3 has a bent portion 3i which is bent approximately in the direction of optical axis 14 from fixed portion 11 and in the direction toward the optical disk. Bent portion 3i of elastic supporting member 3 that is closer to the disk is arranged in a position where the deflection angle of elastic supporting member 3 is smaller.

Figure 26:
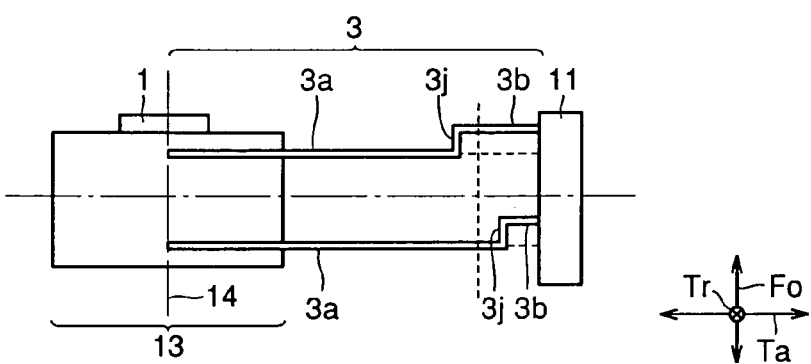
FIG. 26 is a side view showing another exemplary sixth modification of elastic supporting member 3 of objective lens driving device for optical disk 100 according to the first modification of the present invention.

As shown in FIG. 26 of another example of the sixth modification, at least one pair of elastic supporting members 3 are arranged in parallel in the direction of optical axis 14 of objective lens 1. Elastic supporting member 3 has a bent portion 3j that is bent in the direction of optical axis 14 from fixed portion 11 and in the direction opposite the disk. Bent portion 3j of elastic supporting member 3 farther from the disk is arranged in a position where the deflection angle of elastic supporting member 3 is smaller.

Function and Effect

As in the case of each respective supporting member 3, elastic supporting member 3 showing the above described structure of FIGS. 25 and 26 can minimize tilt of optical axis 14 of objective lens 1.

Figure 27:
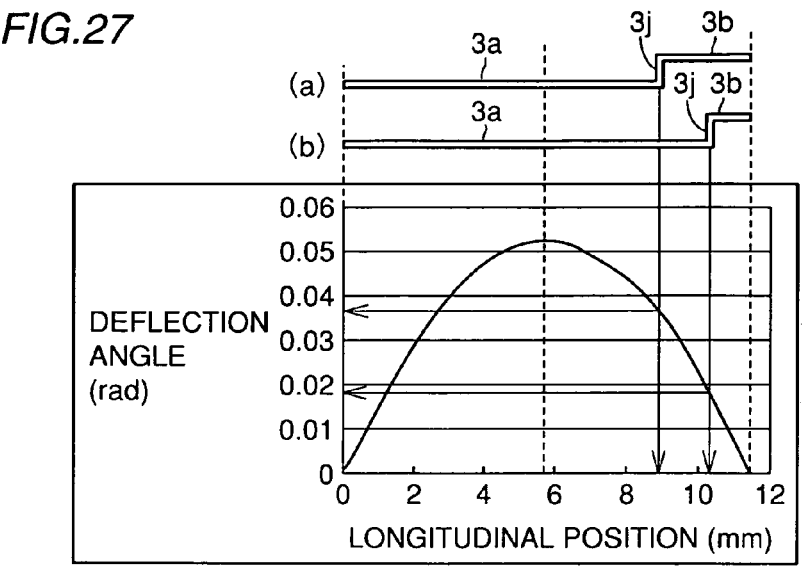
FIG. 27 is a graph showing a relationship between a longitudinal position and deflection angle of a bent portion of elastic supporting member 3 shown in FIG. 26.

For example, a graph of FIG. 27 shows a relationship between "longitudinal position" and "deflection angle" at the bent portion of the linear beam shown in FIG. 8. FIGS. 27A and 27B respectively relates to upper and lower elastic supporting members 3 shown in FIG. 26. A relationship between the bent portion and deflection angle of each elastic supporting member 3 is shown. As can be seen in FIG. 27, upper bent portion 3j of FIG. 27A is arranged in a position with a greater deflection angle than lower bent portion 3j of FIG. 27B. With this structure, upper elastic supporting member 3 is displaced to a greater extent in the longitudinal direction of elastic supporting member 3 than lower elastic supporting member 3. Namely, upper elastic supporting member 3 becomes longer in the longitudinal direction, so that expansion/contraction of elastic supporting member 3 is caused in the direction opposite moment M due to deflection of elastic supporting member 3, i.e., in the offsetting direction. As a result, tilt of optical axis 14 of the objective lens can be minimized. In addition, a bending length which is sufficient to produce a damping effect can be ensured, a resonance peak is restrained and the distance between elastic supporting members 3 can be reduced. Thus, the device can be reduced in thickness.

Seventh Modification

Structure

Figure 29:
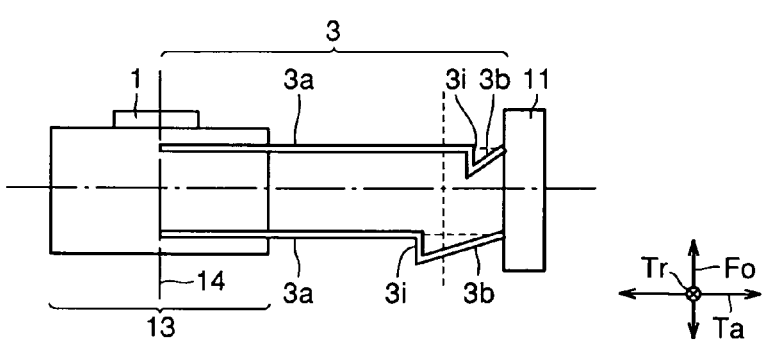
Figure 30:
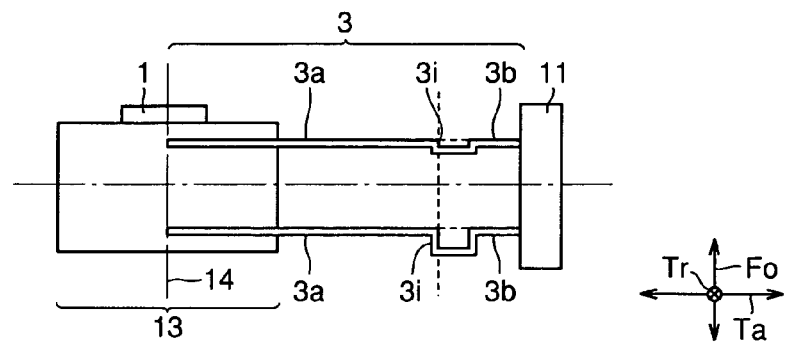

A seventh modification of the objective lens driving device for optical disk is shown. Preferably, as shown in FIGS. 28, 29 and 30, a straight line connecting fixing positions on the sides of movable portion 13 and fixed portion 11 is set approximately in parallel with the disk surface.

Function and Effect

With this structure, the optical axis tilt (tilt toward the direction of Tr) when objective lens 1 is moved in tracking direction Tr can be minimized. Because of asymmetry of elastic supporting members 3 arranged in parallel in the direction of optical axis 14 about a surface perpendicular to the focus direction, when a straight line connecting fixing positions on the sides of movable portion 13 and fixed portion 11 is not parallel to the disk surface, movement of the objective lens in tracking direction Tr may cause imbalance of elastic supporting members 3 arranged in the tracking direction, whereby tilt may be caused in tracking direction Tr.

Figure 28:
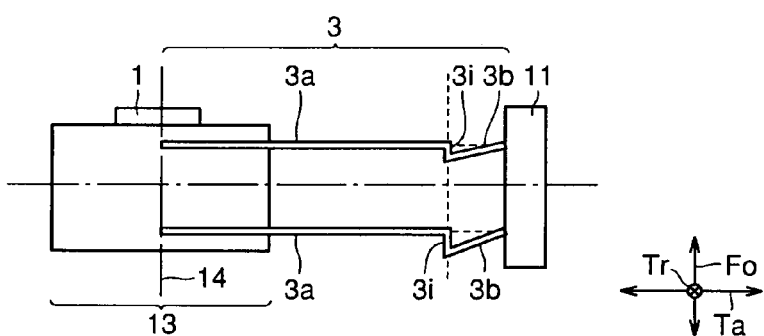
FIGS. 28 to 30 are side views showing a seventh modification of elastic supporting member 3 of objective lens driving device for optical disk 100 according to the first embodiment of the present invention.

More specifically, each elastic supporting member 3 in FIG. 28 is formed of a beryllium copper. Each elastic supporting member 3 has a total length of 11.45 mm. The bent portion is provided in a position 9.76 mm from the end of the movable portion. The longer and shorter bending lengths are respectively 0.56 mm and 0.36 mm. The supporting interval of the movable portions arranged in focus direction Fo is 2.91 mm, and that in tracking direction Tr is 8.26 mm. With this structure, a result of the optical axis tilt in the tangential direction obtained by analysis is 0' when objective lens 1 is moved by 0.4 mm toward the disk side (upper side) in focus direction Fo.

Figure 31:
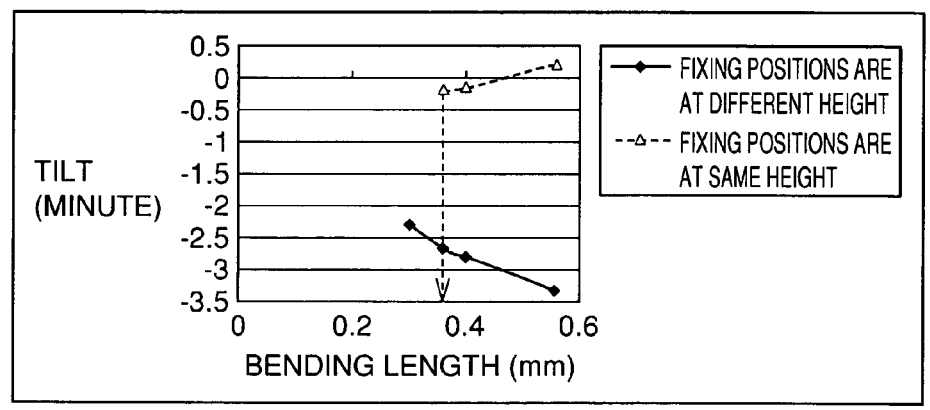
FIG. 31 is a graph showing a relationship between a length of the bent portion and optical axis tilt of elastic supporting member 3 shown in FIG. 28 and elastic supporting member 3 having a fixing portion with different height.

Here, FIG. 31 shows a result of the optical axis tilt in tracking direction Tr obtained by analysis when objective lens 1 is moved by 0.2 mm toward the lower side of the sheet of the drawing with the configuration of the above described elastic supporting member 3.

In FIG. 31, the mark ♦ (difference in height of fixed portions) shows that a straight line connecting fixing positions of movable portion 13 and fixed portion 11 is not parallel to the disk surface (there are height differences of 0.36 mm and 0.56 mm respectively on the upper and lower sides) (for example the structure of elastic supporting member 3 shown in FIG. 22). The mark Δ (heights of fixed portions are the same) shows that a straight line connecting fixing positions on the sides of movable portion 13 and fixed portion 11 is approximately in parallel with the disk surface.

As can be seen from FIG. 31, by making a straight line connecting fixing positions on the sides of movable portion 13 and fixed portion 11 approximately in parallel with the disk surface, if the shorter bending portion has a length of 0.36 mm such that the optical axis tilt in tangential direction Ta is 0' when the objective lens is moved by 0.4 mm toward the disk (upper side) in focus direction Fo, the optical axis tilt in tracking direction Tr can be restrained to about 0' when the objective lens is moved by 0.2 mm in the forward direction orthogonal to the sheet of the drawing in tracking direction Tr.

Thus, since neighboring elastic supporting members 3 arranged in parallel in the direction of optical axis 14 are asymmetric about a surface perpendicular to the focus direction, the optical axis tilt of objective lens 1 may be caused when objective lens 1 is moved in the tracking direction. However, such tilt of optical axis 14 of the objective lens can be minimized by setting the straight line connecting fixing positions on the sides of movable portion 13 and fixed portion 11 approximately in parallel with the disk surface.

The above discussion relates to elastic supporting member 3 shown in FIG. 28. Even in the case of elastic supporting members 3 respectively shown in FIGS. 29 and 30, a similar function and effect can be produced.

Second Embodiment

Figure 32:
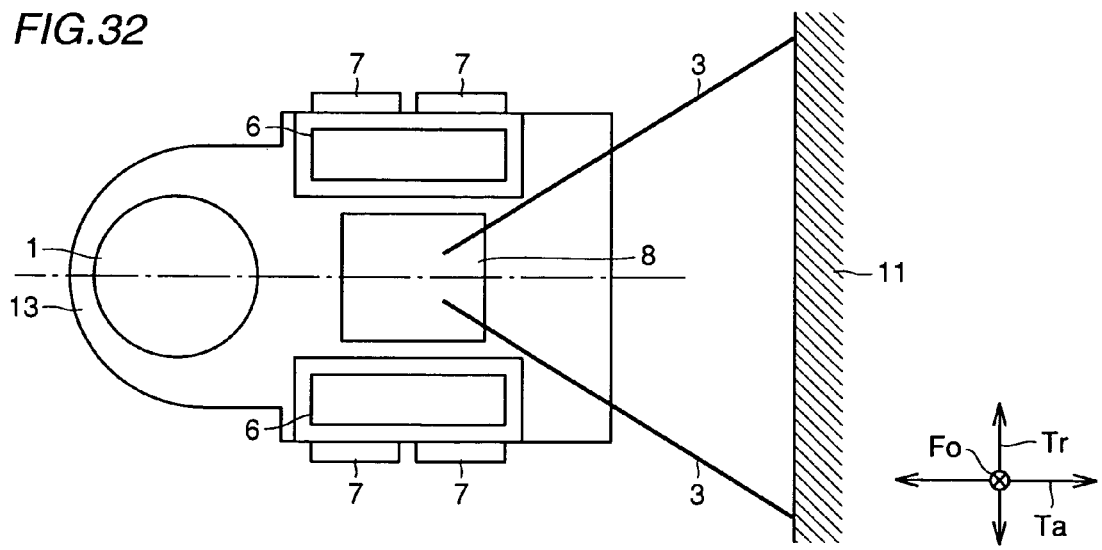
FIG. 32 is a view showing an objective lens driving device according to a second embodiment of the present invention when viewed from above.

Now, referring to FIG. 32, an objective lens driving device according to a second embodiment of the present invention will be described. FIG. 32 is a view showing the objective lens driving device of the second embodiment when viewed from above. The device includes: a movable portion 13 including an objective lens 1, an objective lens holder, a focus coil 6, a tracking coil 7, a mounting member 8 and the like; fixed portion 11; and an elastic supporting member 3 connecting movable portion 13 and fixed portion 11. Elastic supporting member 3 is provided to be inwardly inclined from fixed portion 11 toward movable portion 13. The above described elastic supporting member 3 of the present invention can be applied to such a structure. With this structure, in addition to a tilt correction effect as described above, the following effect can be obtained during focus movement.

First of all, movement in the tracking direction will be described in detail. FIG. 33 shows a prior art example where four beams are mounted in parallel. In FIG. 33, G and F respectively represent a center of gravity and a power point on the focus side. FIG. 33A relates to the case where the objective lens is in a neutral position not moved in the tracking direction. FIG. 33B relates to the case where the objective lens is moved in the tracking direction (in the left direction indicated by an arrow). As shown in FIG. 33A, when a force is applied in the focus direction in the neutral position, the movable portion is displaced approximately in the focus direction since center of gravity G and focus power point F are on the same straight line. However, if a force is applied in the focus direction with the objective lens displaced in the tracking direction (the left direction indicated by an arrow) as shown in FIG. 33B, the central position of a magnetic circuit, i.e., power point F and center of gravity G of the movable portion would not be placed on the same straight line. A moment is produced in the arrow direction as shown at the bottom of FIG. 33B, thereby causing optical axis displacement in the tracking direction.

Figure 34A:
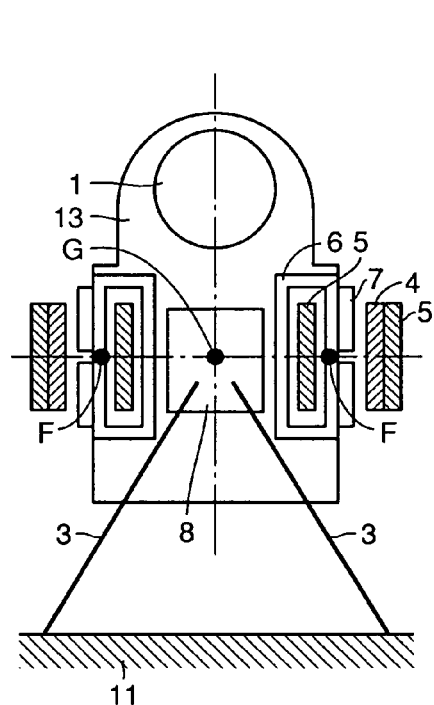
FIGS. 34A and 34B are diagrams shown in conjunction with movement in the tracking direction of the objective lens driving device according to the second embodiment, where 34A shows that the objective lens is not moved in the tracking direction, and 34B shows that the objective lens is moved in the tracking direction (in the left direction indicated by an arrow in the drawing).
Figure 34B:
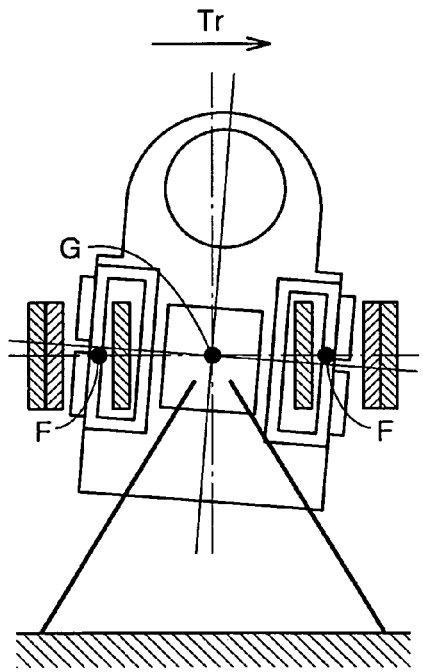
Figure 34B:
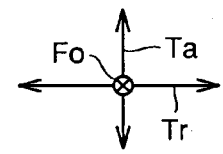

Now, movement in the tracking direction of the structure shown in FIG. 32 will be described. In FIG. 34, G and F respectively represent a center of gravity and power point in the focus direction. FIG. 34A relates to the case where the objective lens is in a neutral position not moved in the tracking direction. FIG. 34B relates to the case where the objective lens is moved in the tracking direction (in the left direction indicated by an arrow). As shown in FIG. 34A, when a force is applied in the focus direction in the neutral position, the movable portion is displaced approximately in the focus direction since center of gravity G and focus power point F are on the same straight line. As shown in FIG. 34B, if a force is applied in the focus direction with the objective lens moved in the radial direction (the left direction indicated by an arrow), rotation in the tracking direction is caused. Thus, the central position of the magnetic circuit, i.e., power point F and center of gravity G of the movable portion are placed on the same straight line. Accordingly, in the structure of FIG. 34, unlike the structure which causes parallel tracking movement as in FIG. 33, tilt is caused to the objective lens due to a moment caused as a result of displacement of power point F and center of gravity G. Namely, the optical axis would not tilt.

Figure 35:
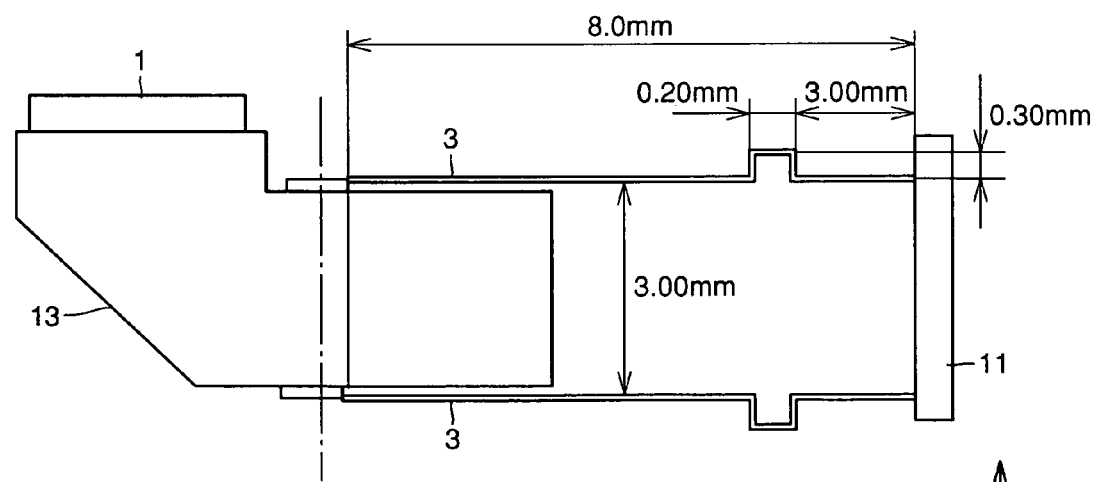
FIG. 35 is a diagram showing the structure of a supporting beam.
Figure 35:
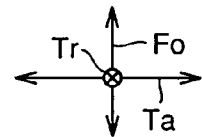

Based on the above, an experiment was conducted by analysis with use of a supporting beam shown in FIG. 35. Each supporting member has a total length of 8.0 mm. The length from the fixed portion to a bent portion is 3 mm, a distance of the bent portion is 0.2 mm, and the bending length is 0.3 mm. The supporting members are vertically symmetric in the focus direction. The upper and lower beams are in parallel with an interval of 3 mm.

The beam has a thickness of 0.05 mm and a width of 0.06 mm. The width of the bent portion is 0.12 mm. Although not shown, the supporting member is provided inwardly from the fixed portion side toward the movable portion side at an angle of 90°.

With this structure, tilt of the optical axis was measured with the objective lens moved vertically by 0.4 mm from the central point in the focus direction and horizontally moved by 0.2 mm from the central position in the tracking direction. Then, the measured tilt was approximately 0 and, even if the objective lens was moved both in the focus direction and radial direction, the optical axis tilt was approximately 0.

Figure 36A:
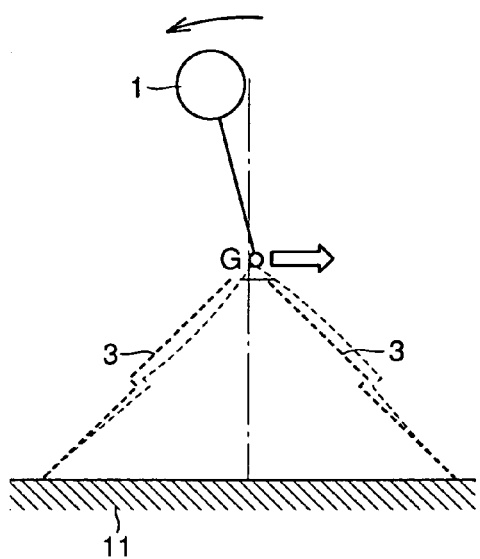
FIGS. 36A and 36B are diagrams showing a beam having a bent portion in the tracking direction, where 36A shows a structure having a portion outwardly bending from the fixing portion side toward the movable portion side, and 36B shows a structure having a portion inwardly bending from the fixing portion side toward the movable portion side.
Figure 36B:
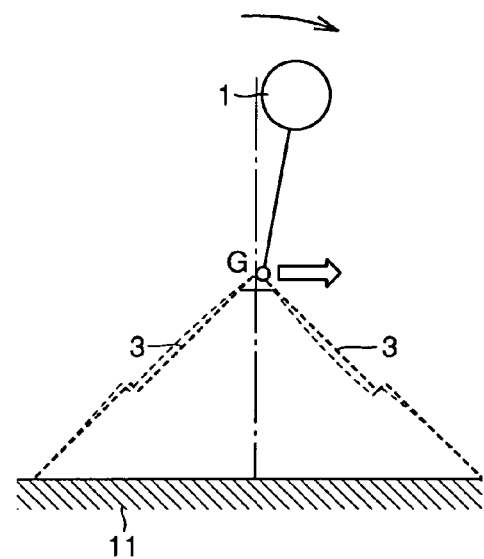

Further, a shift amount (self weight drop) when a gravitational force is applied in the tracking direction will be described. FIG. 36 shows beams each having a bent portion in the tracking direction. FIG. 36A shows a structure in which the bent portion is bent outwardly from the fixed portion side toward the movable portion side. FIG. 36B shows a structure in which the bent portion is bent inwardly from the fixed portion side toward the movable portion side. When a gravitational force is applied in the direction indicated by an outline arrow to a beam supported at both ends, in the case of FIG. 36A, the objective lens tends to shift not only in the same direction as the gravitational force but also in the direction opposite the direction of the gravitational force because of the bent portion. In FIG. 36B, the objective lens is shifted in the same direction as the gravitational force direction, and the shift amount of the objective lens tends to increase in the gravitational force direction because of the bent portion.

For example, the supporting member of FIG. 36 has a total length of 8.9 mm. The length from the fixed portion side to the bent portion is 4 mm, and the bending length is 0.3 mm. The upper and lower beams are arranged in parallel with an interval of 3 mm to be vertically symmetric in the focus direction. The beam has a thickness of 0.05 mm and a width of 0.06 mm. The width of the bent portion is 0.12 mm. The beam is provided inwardly from the fixed portion side toward the movable portion side at an angle of 90°. In this structure, an amount of displacement from the center of the objective lens when a gravitational force is applied to the movable portion of about 280 mg in the tracking direction was measured by analysis. In the case of FIG. 36A, a shift amount was 4.9 μm in the direction opposite the gravitational force direction. In the case of FIG. 36B, a shift amount was 7.7 μm in the same direction as the gravitational force. On the other hand, an amount of displacement from the center of the objective lens when a gravitational force is applied to the movable portion of about 280 mg in the tracking direction was 1.2 μm in the same direction as the gravitational force, in the case of FIG. 35. It can be seen that the shift amount of the objective lens is smaller than in the case of FIG. 36.

In the structure where the bending portion is provided in the tracking direction, the shift amount of the objective lens when the gravitational force is applied in the tracking direction increases because of the bent portion. However, if the bent portion which is bent in the focus direction is provided as in the present invention, shift due to the gravitational force can be restrained.

Function and Effect

With the above described structure, when the objective lens is shifted in the focus and radial directions not to mention during focus and radial movements, the tilt of the objective lens can be minimized. In addition, when used for a portable device where gravitational forces are applied in all directions, less power is used for aligning the lens center. Thus, power consumption can be minimized.

Third Embodiment

Structure

Figure 37:
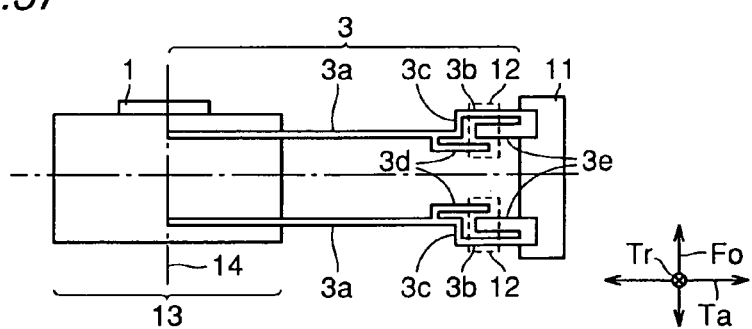
FIG. 37 is a side view showing an elastic supporting member 3 according to a third embodiment of the present invention.
Figure 38:
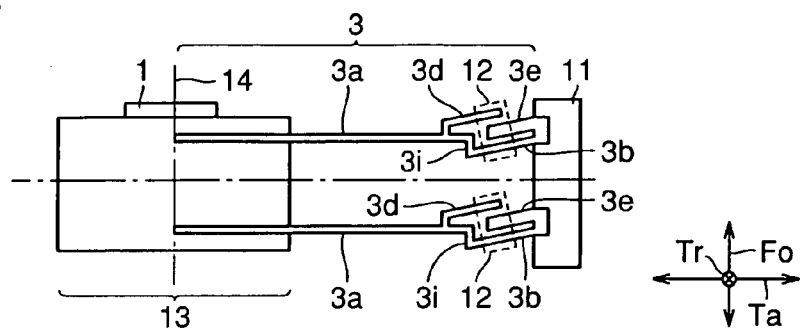
FIG. 38 is a side view showing a modification of elastic supporting member 3 according to the third embodiment of the present invention.

Now, referring to FIGS. 37 and 38, an elastic supporting member 3 of an objective lens driving device according to the third embodiment of the present invention will be described. As shown in FIGS. 37 and 38, elastic supporting member 3 of the present embodiment includes an arm portion 3d of a free end branching from elastic supporting member 3 around at least one bent portion (3c of FIG. 37, 3i of FIG. 38), a protruding portion 3e formed at a connecting portion with respect to fixed portion 11, where at least arm portion 3d and protruding portion 3e are connected by a damper material 12.

Function and Effect

With elastic supporting member 3 of the third embodiment, the bent portion (3c of FIG. 37, 3i of FIG. 38) of each elastic supporting member 3, which is bent approximately in the direction of optical axis 14, serves to minimize tilt of optical axis 14 of the objective lens, as stated previously. Further, simple configuration of elastic supporting member 3 suppresses vibrations in focusing direction Fo and tracking direction Tr as well as torsional oscillation of elastic supporting member 3. Thus, a resonance peak can be restrained.

Fourth Embodiment

Structure

Figure 39:
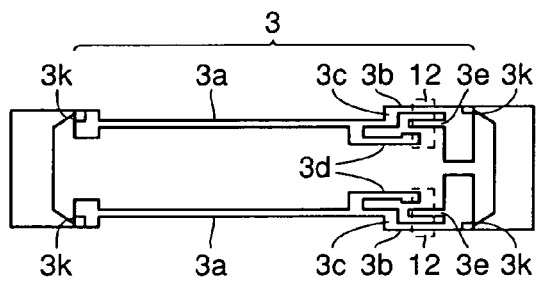
FIG. 39 is a view of elastic supporting member 3 according to the third embodiment of the present invention when viewed from above.

Now, referring to FIG. 39, elastic supporting member 3 of an objective lens driving device of the fourth embodiment of the present invention will be described. As shown in FIG. 39, a pair of elastic supporting members 3 arranged in the direction of optical axis 14 of objective lens 1 are integrally formed and separated after assembly. FIG. 39 shows that elastic supporting member 3 can be formed by etching a thin plate of a beryllium copper. Two elastic supporting members 3 arranged in parallel in focus direction Fo are connected by a portion 3k, which is disconnected after assembly.

Function and Effect

With elastic supporting member 3 of the fourth embodiment, elastic supporting members 3 arranged in parallel in the direction of optical axis 14 are integrally formed to enable facilitate assembly. As compared with the case where two elastic supporting members 3 arranged in parallel in the focus direction are positioned for example with use of a jig for assembly, elastic supporting members 3 are integrally formed, so that a bending position, a tilt angle of the slope portion, vertical arrangement and the like can be more precisely determined. Thus, tilt correction of the optical axis can be more accurately performed.

Fifth Embodiment

Structure

Figure 40:
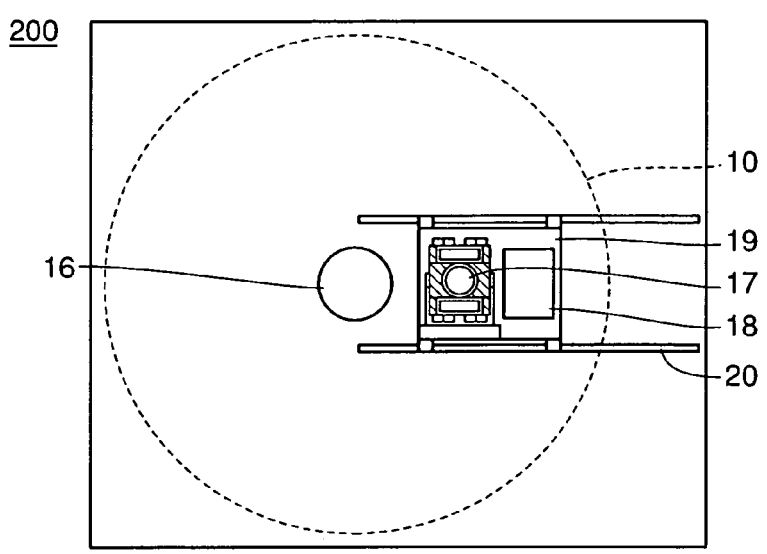
FIG. 40 is a view schematically showing an optical recording/reproducing apparatus incorporating objective lens driving device for optical disk 100 according to the first embodiment.

Now, referring to FIG. 40, an optical recording/reproducing apparatus 200 of the fifth embodiment of the present invention will be described. FIG. 40 is a top view schematically showing optical recording/reproducing apparatus 200 provided with objective lens driving device for optical disk 100 of the first embodiment.

Referring to FIG. 40, optical recording/reproducing apparatus 200 includes a spindle motor 16 for rotating optical disk 10, objective lens driving device for optical disk 17, an optical unit 19 provided with a laser unit or an optical part 18, including various types of lenses and prisms, and a feeding mechanism 20 enabling movement of optical unit 19.

In the above described optical recording/reproducing apparatus 200, feeding mechanism 20 enables movement of optical unit 19 and slight movement of the movable portion of objective lens driving device for optical disk 100 at high speed. Thus, spots of laser beams can follow a prescribed track of optical disk 10 which is rotating at high speed.

Although objective lens driving device for optical disk 100 of the first embodiment is used as an objective lens driving device for optical disk here, any other device may be used.

Figure 41:
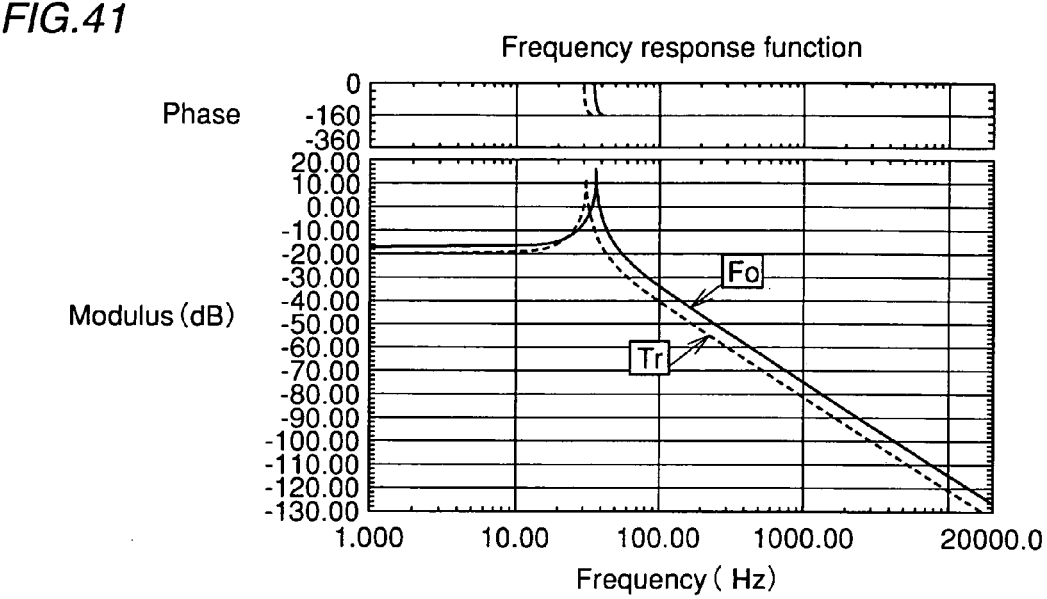
FIG. 41 is a diagram shown in conjunction with a transfer characteristic of a focus system and tracking system of the optical recording/reproducing apparatus.

FIG. 41 shows an analysis result pertaining to transfer properties of a servo system in objective lens driving device for optical disk 100 (using elastic supporting member 3 shown in FIG. 5). An arrow indicated by Fo corresponds to transfer properties of a focus system, and an arrow indicated by Tr corresponds to transfer properties of a tracking system. The ordinate and abscissa respectively represents vibration (dB) and frequency (Hz) in logarithmic representation.

As can be seen from FIG. 41, no resonance is found between frequencies of 100 Hz and 20 kHz after a primary resonant point, exhibiting favorable transfer properties. The above described other shapes of elastic supporting members 3 also exhibited favorable properties.

Function and Effect

As described above, in the optical recording/reproducing apparatus using the objective lens driving device for optical disk, tilt of optical axis 14 is minimized during movement of the objective lens. Thus, spots are precisely directed to the disk to allow favorable and accurate recording/reproduction. Since vibration of elastic supporting member 3 can be restrained, a more stable servo property is obtained. In addition, the movable portion can be reduced in thickness, so that the overall thickness of the device can be reduced.

In the optical recording/reproducing apparatus, if a light source of a short wavelength of about 400 nm is used, coma aberration increases with reduction in wavelength since it is in inverse relationship with the wavelength. For example, coma aberration differs by about 1.9 times between wavelengths of 780 nm and 410 nm. To reduce coma aberration, the tilt amount on the side of the optical recording/reproducing apparatus must be reduced by about 50%. Thus, it is desirable that the tilt amount allowed to the actuator is about 50% or lower of the current value.

Figure 42:
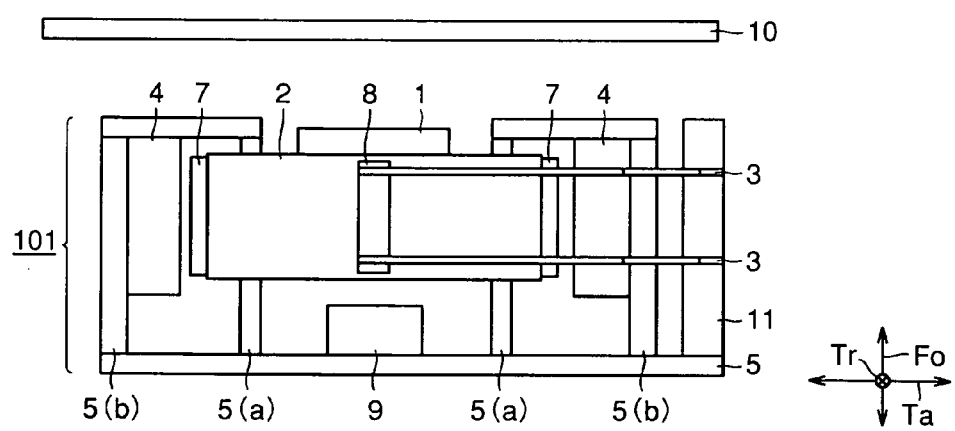
FIG. 42 is a side view showing objective lens driving device for optical disk 101 of the prior art.
Figure 43:
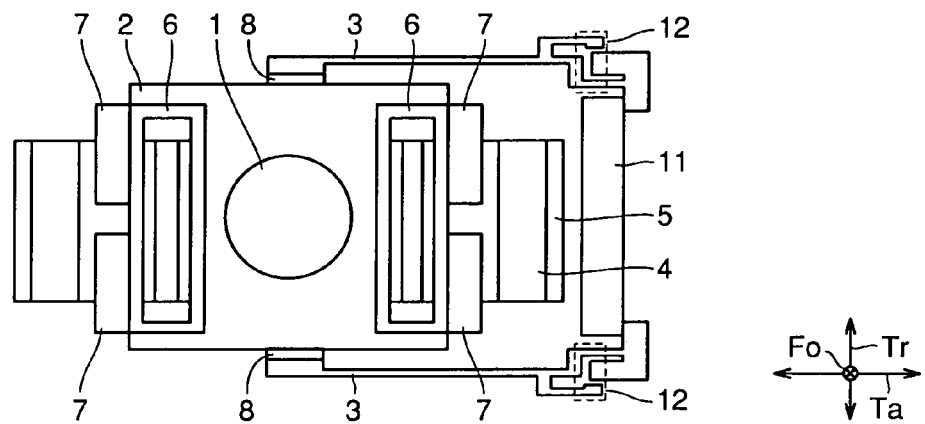
FIG. 43 is a top view showing objective lens driving device for optical disk 101.
Figure 44:
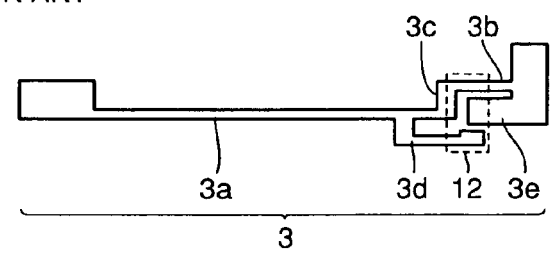
FIG. 44 is a top view showing elastic supporting member 3 of objective lens driving device for optical disk 101.
Figure 45A:
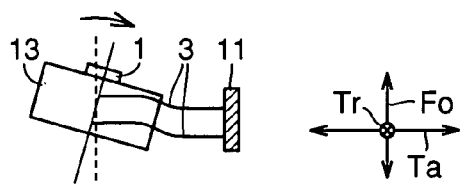
FIGS. 45A to 45C are side views of objective lens driving device for optical disk during movement of the objective lens of the prior art.
Figure 45B:
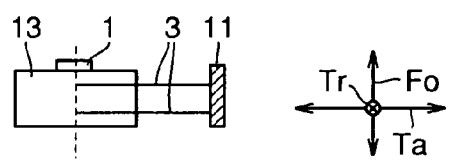
Figure 45C:
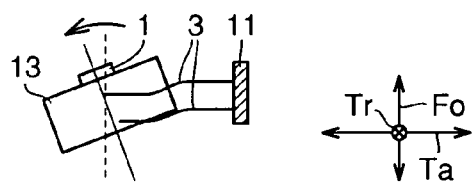
Figure 46:
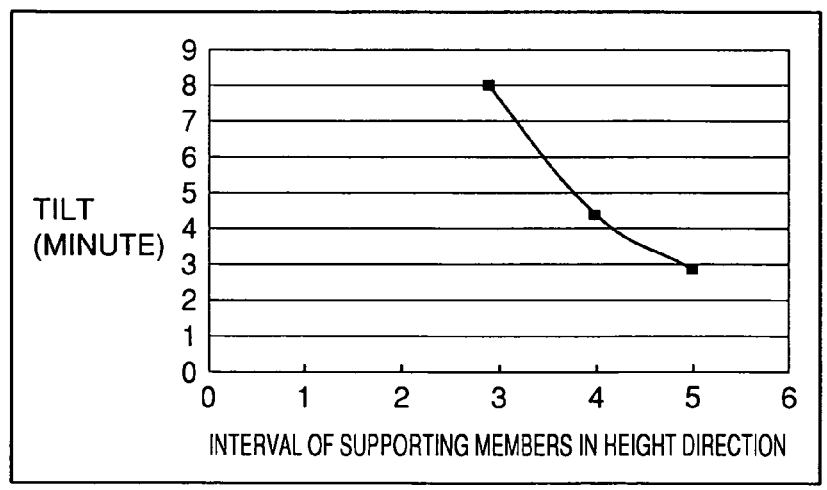
FIG. 46 is a graph showing a relationship between an interval of elastic supporting members 3 in the height direction and an optical axis tilt of objective lens driving device for optical disk 101 of the prior art.

As described above, in the conventional objective lens driving device for optical disk shown in FIGS. 42 and 43, if the current acceptable amount (wavelength of 780 nm) of tilt is ±7.6' when the objective lens is vertically moved in the focus direction (±0.4 mm), the tilt must be restrained to about ±4' in the device using a light source having a wavelength of 410 nm. However, the use of elastic supporting member 3 of the present embodiment can restrain tilt to about 0', offsetting the acceptable tilt amount of the other parts.

With use of elastic supporting member 3 of the present embodiment, the tilt of optical axis 14 can be minimized during movement of the objective lens. Thus, spots are precisely directed to the disk to enable accurate recording/reproduction. Even if a light source with a short wavelength of about 400 nm is used, spots are precisely directed to the disk for accurate recording/reproduction and vibration of elastic supporting member 3 can be suppressed. As a result, a more stable servo property can be obtained. In addition, the overall thickness of the device can be reduced.

In the above, the shape, size and material of elastic supporting member 3 are exemplified. However, such a shape, size and material are not limited to those specified above and the structure of the objective lens driving device is not limited to that specified above.

In each of the above described embodiments, a tilt correction method of a movable portion which is a distinguishing feature of the present invention is applied to the tilt correction method for the objective lens of optical disk and the objective lens driving device for optical disk. However, the present invention is not limited to the tilt correction method of the objective lens for optical disk and the objective lens driving device for optical disk. The present invention can also be applied to a device in which a movable portion and fixed portion are connected by a plurality of elastic supporting members and the movable portion is provided in a manner displaceable in the direction orthogonal to the longitudinal direction of the elastic supporting member (hereinafter referred to as the orthogonal direction) and which requires correction of tilt of the movable portion caused when the movable portion is moved in the orthogonal direction.

According to the tilt correction method for movable portion, tilt correction method for objective lens of optical disk, and objective lens driving device for optical disk of the present invention, by adjusting deflections of neighboring elastic supporting members approximately arranged in the focus direction, expansion/contraction of the elastic supporting members is caused in the direction opposite the moment, i.e., in the offsetting direction, whereby tilt of the objective lens in the focus direction can be minimized. In addition, the tilt of the objective lens can be corrected and the distance between the elastic supporting members can be reduced. As a result, the device can be reduced in thickness and size.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tilt correction method of a movable portion for correcting tilt of said movable portion caused when said movable portion is moved in a direction orthogonal to a longitudinal direction of an elastic supporting member (hereinafter referred to as an orthogonal direction), comprising:
said movable portion being connected to a fixed portion by a plurality of elastic supporting members mid displaceably arranged in said orthogonal direction, each of said plurality of elastic supporting members having at least one bent portion, wherein the tilt of said movable portion is corrected by varying expansion/contraction amounts of said bent portions of said plurality of elastic supporting members caused when said movable portion is moved in said orthogonal direction,
wherein said bent portions are bent approximately in the orthogonal direction.

2. A tilt correction method of an objective lens for an optical disk for correcting tilt of a movable portion caused when moved in a focus direction, comprising:
said movable portion holding said objective lens, a fixed portion, and a plurality of elastic supporting members connecting said movable portion and said fixed portion for elastically supporting said movable portion in a manner displaceable at least in the focus direction are being provided, wherein
said elastic supporting members each have at least one bent portion bent approximately in the focus direction, and said bent portions of said elastic supporting members arranged in parallel in the focus direction are adjusted to cause expansion/contraction of said elastic supporting members in a direction offsetting a moment produced from deflection of said elastic supporting member.

3. The tilt correction method according to claim 2, wherein said bent portions are bent approximately in the focus direction.

4. An objective lens driving device for an optical disk including a movable portion holding an objective lens, a fixed portion, and a plurality of elastic supporting members connecting said movable portion and said fixed portion and elastically supporting said movable portion in a manner displaceable at least in a focus direction, wherein each of said plurality of elastic supporting members has at least one bent portion, comprising
correction control means for controlling tilt of said movable portion caused when moved in the focus direction by adjusting deflections of said bent portions of said elastic supporting members arranged in parallel in the focus direction to cause expansion/contraction of said elastic supporting members in a direction offsetting a moment produced from deflection of said elastic supporting member,
wherein said bent portions are bent approximately in the focus direction.

5. The objective lens driving device for optical disk according to claim 4, wherein each said elastic supporting member has at least one bent portion bent approximately in the focus direction for adjustment of deflection.

6. The objective lens driving device for optical disk according to claim 4, wherein two of said plurality of elastic supporting members are arranged in parallel approximately in the focus direction and are symmetric about a surface perpendicular to the focus direction.

7. The objective lens driving device for optical disk according to claim 4, wherein said two elastic supporting members arranged in parallel approximately in the focus direction have a slope portion.

8. The objective lens driving device for optical disk according to claim 4, wherein said two elastic supporting members arranged in parallel approximately in the focus direction have a bent portion bent approximately in a tracking direction.

9. The objective lens driving device for optical disk according to claim 4, wherein said two elastic supporting members arranged in parallel approximately in the focus direction have a bent portion approximately in a shape of a square with one side opened.

10. The objective lens driving device for optical disk according to claim 4, wherein said elastic supporting members arranged in parallel approximately in the focus direction have said respective bent portions at the same position from the fixed portion, and bending lengths of said bent portions are different.

11. The objective lens driving device for optical disk according to claim 4, wherein said elastic supporting members arranged in parallel approximately in the focus direction have said bent portions at different positions from the fixed portion, and bending lengths of said bent portions are the same.

12. The objective lens driving device for optical disk according to claim 4, wherein said elastic supporting member is provided in such a way that a straight line connecting fixing positions on the sides of said movable portion and said fixed portion is approximately in parallel with a disk surface.

13. The objective lens driving device for optical disk according to claim 4, wherein said movable portion is supported in a manner displaceable approximately in a radial direction, and a displacement in the radial direction is caused by rotation approximately about a center of gravity.

14. The objective lens driving device for optical disk according to claim 13, wherein said elastic supporting member is provided inwardly from said fixed portion toward said movable portion.

15. The objective lens driving device for optical disk according to claim 4, wherein an arm portion and a protruding portion of free ends branched from said elastic supporting member are connected by a damper material near said at least one bent portion of said elastic supporting member.

* * * * *